(12) United States Patent
Glugla

(10) Patent No.: US 9,284,880 B2
(45) Date of Patent: Mar. 15, 2016

(54) CHARGE AIR COOLER CONDENSATE PURGING CYCLE

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/630,426

(22) Filed: Feb. 24, 2015

(65) Prior Publication Data

US 2015/0167540 A1    Jun. 18, 2015

Related U.S. Application Data

(63) Continuation of application No. 13/648,854, filed on Oct. 10, 2012, now Pat. No. 8,961,368.

(51) Int. Cl.

| *F02D 41/12* | (2006.01) |
|---|---|
| *F02B 29/04* | (2006.01) |
| *B60W 30/18* | (2012.01) |
| *F02D 29/02* | (2006.01) |
| *F02M 25/028* | (2006.01) |
| *F02D 41/00* | (2006.01) |
| *B60W 10/06* | (2006.01) |
| *B60W 10/08* | (2006.01) |
| *B60W 10/11* | (2012.01) |

(Continued)

(52) U.S. Cl.
CPC ............ *F02B 29/0468* (2013.01); *B60W 10/06* (2013.01); *B60W 10/08* (2013.01); *B60W 10/11* (2013.01); *B60W 10/184* (2013.01); *B60W 10/30* (2013.01); *B60W 20/108* (2013.01); *B60W 30/18* (2013.01); *B60W 30/188* (2013.01); *B60W 30/18127* (2013.01); *B60W 30/18136* (2013.01); *F02B 29/0418* (2013.01); *F02D 29/02* (2013.01); *F02D 41/0005* (2013.01); *F02D 41/0007* (2013.01); *F02D 41/0025* (2013.01); *F02D 41/123* (2013.01); *F02M 25/028* (2013.01); *F02D 41/0225* (2013.01); *F02D 2200/0418* (2013.01); *F02D 2250/41* (2013.01); *F02M 25/0707* (2013.01); *F02M 25/0713* (2013.01); *Y02T 10/146* (2013.01); *Y02T 10/42* (2013.01); *Y10S 903/93* (2013.01); *Y10T 477/23* (2015.01); *Y10T 477/50* (2015.01); *Y10T 477/679* (2015.01); *Y10T 477/68* (2015.01)

(58) Field of Classification Search
None
See application file for complete search history.

(56) References Cited

U.S. PATENT DOCUMENTS

| 3,733,931 A * | 5/1973 | Nyman ................... F16H 47/04 475/82 |
| 4,964,318 A * | 10/1990 | Ganoung ............. B60K 41/142 123/478 |

(Continued)

FOREIGN PATENT DOCUMENTS

| EP | 1607606 A1 | 6/2004 |
| JP | H09256915 A | 9/1997 |

*Primary Examiner* — Justin Holmes
(74) *Attorney, Agent, or Firm* — Julia Voutyras; Alleman Hall McCoy Russell & Tuttle LLP

(57) ABSTRACT

Methods and systems are provided for purging condensate from a charge air cooler to an engine intake. During an engine deceleration event, the vehicle is downshifted into a lower gear to increase RPM and airflow through a charge air cooler to purge stored condensate to the engine intake. By delivering condensate while an engine is not fueled, misfire events resulting from ingestion of water are reduced.

20 Claims, 9 Drawing Sheets

(51) Int. Cl.
*F02D 41/02* (2006.01)

(56) References Cited

U.S. PATENT DOCUMENTS

| | | | |
|---|---|---|---|
| 6,748,475 | B1 | 6/2004 | Sørensen |
| 7,007,680 | B2 | 3/2006 | Tussing et al. |
| 2010/0077995 | A1 | 4/2010 | Buia et al. |
| 2011/0094219 | A1 | 4/2011 | Palm |
| 2012/0221223 | A1* | 8/2012 | Schaffeld ............... F02B 33/38 701/102 |
| 2013/0000601 | A1* | 1/2013 | VanDerWege .......... F02D 41/06 123/435 |
| 2013/0032127 | A1* | 2/2013 | Jentz .................... F02N 11/003 123/520 |
| 2014/0100758 | A1 | 4/2014 | Glugla et al. |
| 2014/0109568 | A1 | 4/2014 | Glugla et al. |
| 2014/0128221 | A1 | 5/2014 | Glugla et al. |

\* cited by examiner

CHARGE AIR COOLER CONDENSATE PURGING CYCLE

CROSS REFERENCE TO RELATED APPLICATIONS

The present application is a continuation of U.S. patent application Ser. No. 13/648,854, entitled "CHARGE AIR COOLER CONDENSATE PURGING CYCLE," filed on Oct. 10, 2012, now U.S. Pat. No. 8,961,368, the entire contents of which are hereby incorporated by reference for all purposes.

BACKGROUND/SUMMARY

Engines may increase output power by using boosting devices that compress intake air. Since charge compression increases air temperature, charge air coolers may be utilized downstream of a compressor to cool the compressed air, further increasing the potential power output of the engine. As intake air passes through the charge air cooler and is cooled below a dew point, condensation occurs. The condensate may be accumulated at a trap and delivered to the engine subsequently, e.g., during steady-state or cruise conditions, at a controlled rate of ingestion. However, because the ingested water slows the rate of combustion, even small errors in the introduction of water into the engine can increase the likelihood of misfire events. Engine control systems may employ various misfire control approaches to reduce misfires caused by the ingestion of water.

One example approach for addressing moisture induced misfires is shown by Tonetti et al. in EP 1607606. Therein, an intake air flow rate is adjusted based on an oxygen concentration of recirculated exhaust gas to compensate for condensate in the EGR. Another example approach is shown by Wong et al. in U.S. Pat. No. 6,748,475. Therein, a fuel injection and spark timing is adjusted based on a parameter indicative of an oxygen concentration or water concentration of recirculated exhaust gas. This allows misfire events arising during steady-state conditions due to a sudden ingestion of too much water or condensate to be reduced. Even when the amount of water ingested is small, during a transient tip-in from steady state conditions, such as when going from low to moderate air mass flow rates to high air mass flow rates, the ingested water can cause slow combustion issues. In particular, the high air mass flow rate can break the surface tension of the condensate, and release from the charge air cooler where the engine ingests it in larger quantities.

However, the inventors herein have identified potential issues with such an approach. As one example, even with adjustments to intake air flow rate, fuel injection, and/or spark timing, misfires caused due to condensate ingestion during steady-state conditions may not be sufficiently addressed. Specifically, engine combustion stability during steady-state conditions may be sensitive to the amount of condensate. Consequently, even small errors in condensate metering can lead to misfires.

In one example, some of the above issues may be addressed by a method for a boosted engine comprising: downshifting a transmission gear to increase engine speed and increase engine airflow (air mass flow rate) in response to a deceleration event and a condensate level in a charge air cooler (CAC). The method may further include, increasing an opening of an intake throttle to increase airflow through the charge air cooler. In this way, condensate can be purged efficiently without incurring misfire events.

As one example, an engine controller may downshift a transmission gear to initiate delivery of condensate collected at a CAC to an engine during a deceleration event. For example, in response to a tip-out, when the engine is spinning un-fueled (e.g., during a deceleration fuel shut off or DFSO event), the vehicle may be downshifted from a transmission third gear to a transmission second gear to increase engine speed and manifold vacuum. Then, condensate may be pulled into the engine from the CAC. Additionally or optionally, an intake throttle may be opened to increase airflow to the engine and through the CAC. By opening the throttle during the deceleration, intake manifold vacuum generated from the spinning engine may be increased and used to increase purging efficiency.

In this way, by delivering condensate from a CAC to an engine during a deceleration event, the large amount of intake manifold vacuum generated from downshifting can be advantageously used to draw condensate into the engine. By delivering the condensate to the engine during conditions when cylinder combustion is not occurring, the condensate can pass through the engine system without degrading combustion stability. Further, since the condensate is introduced while no combustion is occurring, concurrent engine actuator adjustments for misfire control may not be required. Overall, a larger amount of condensate may be purged into the engine without increasing engine misfires.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
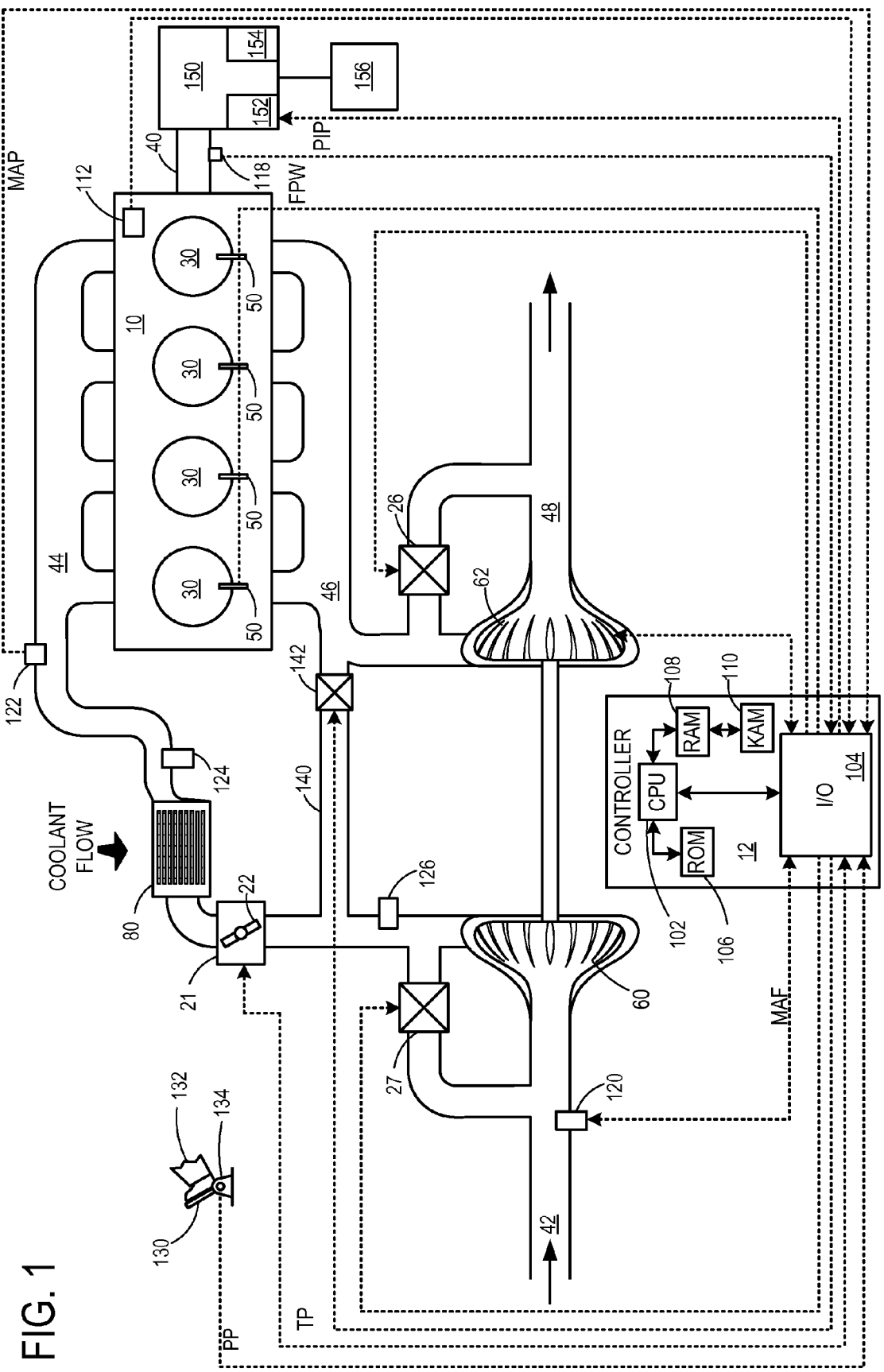
FIG. 1 is a schematic diagram of an example engine system including a charge air cooler.
Figure 6:
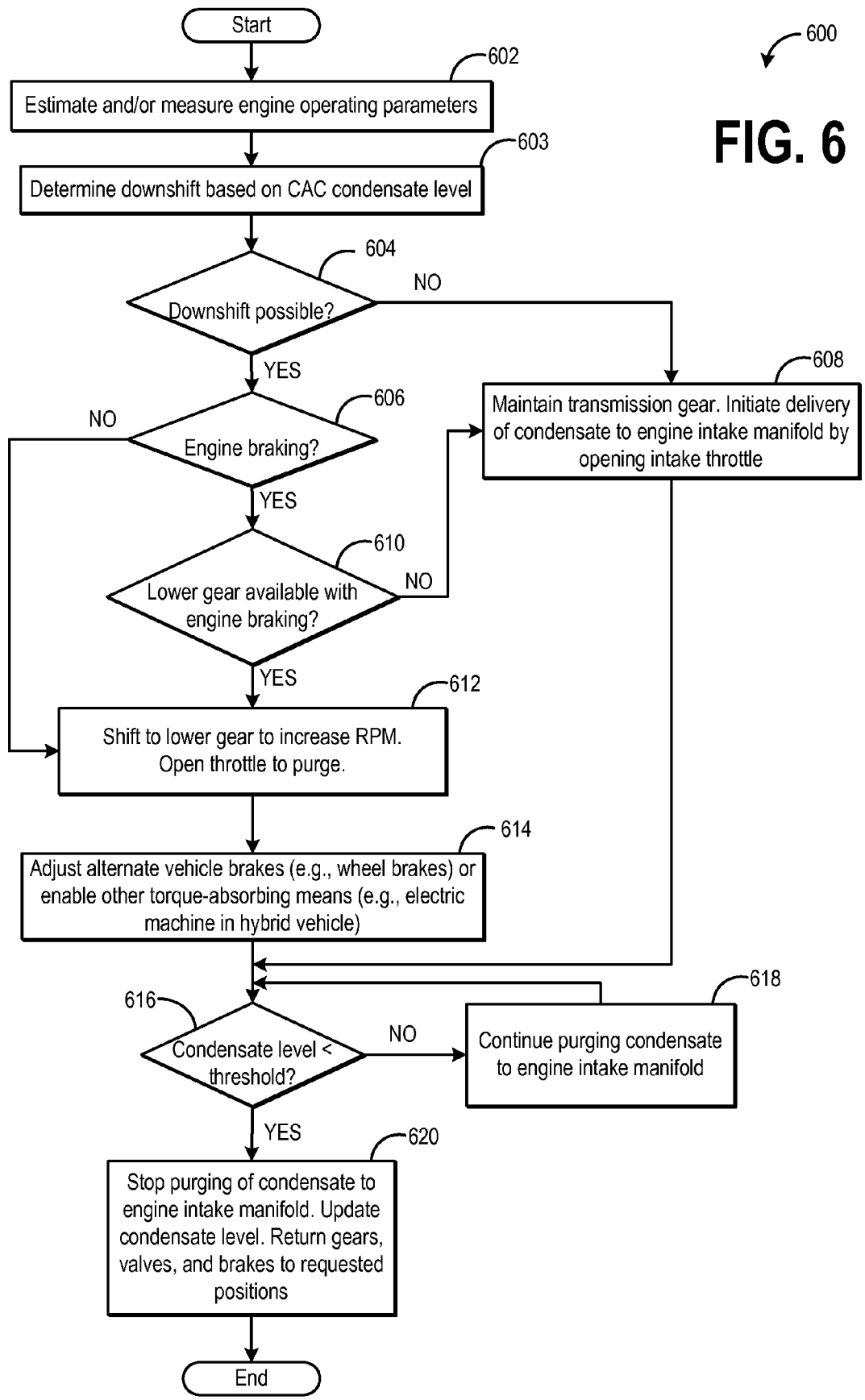
FIG. 6 shows a flow chart illustrating a method for purging CAC condensate to an engine intake during a deceleration event by downshifting a transmission gear and/or increasing airflow through a CAC.
Figure 7:
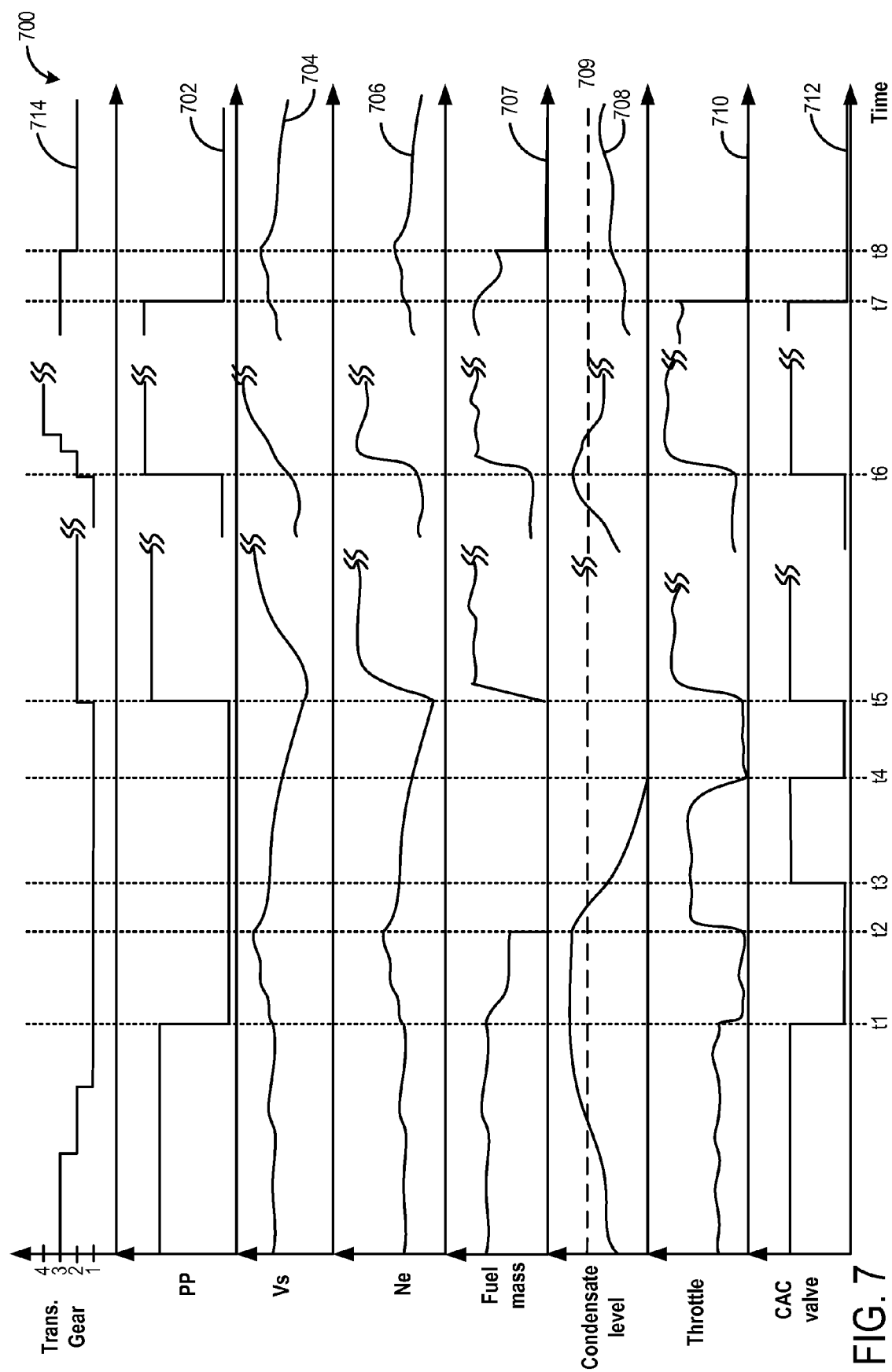
FIGS. 7-8 show example condensate purging operations.
Figure 8:
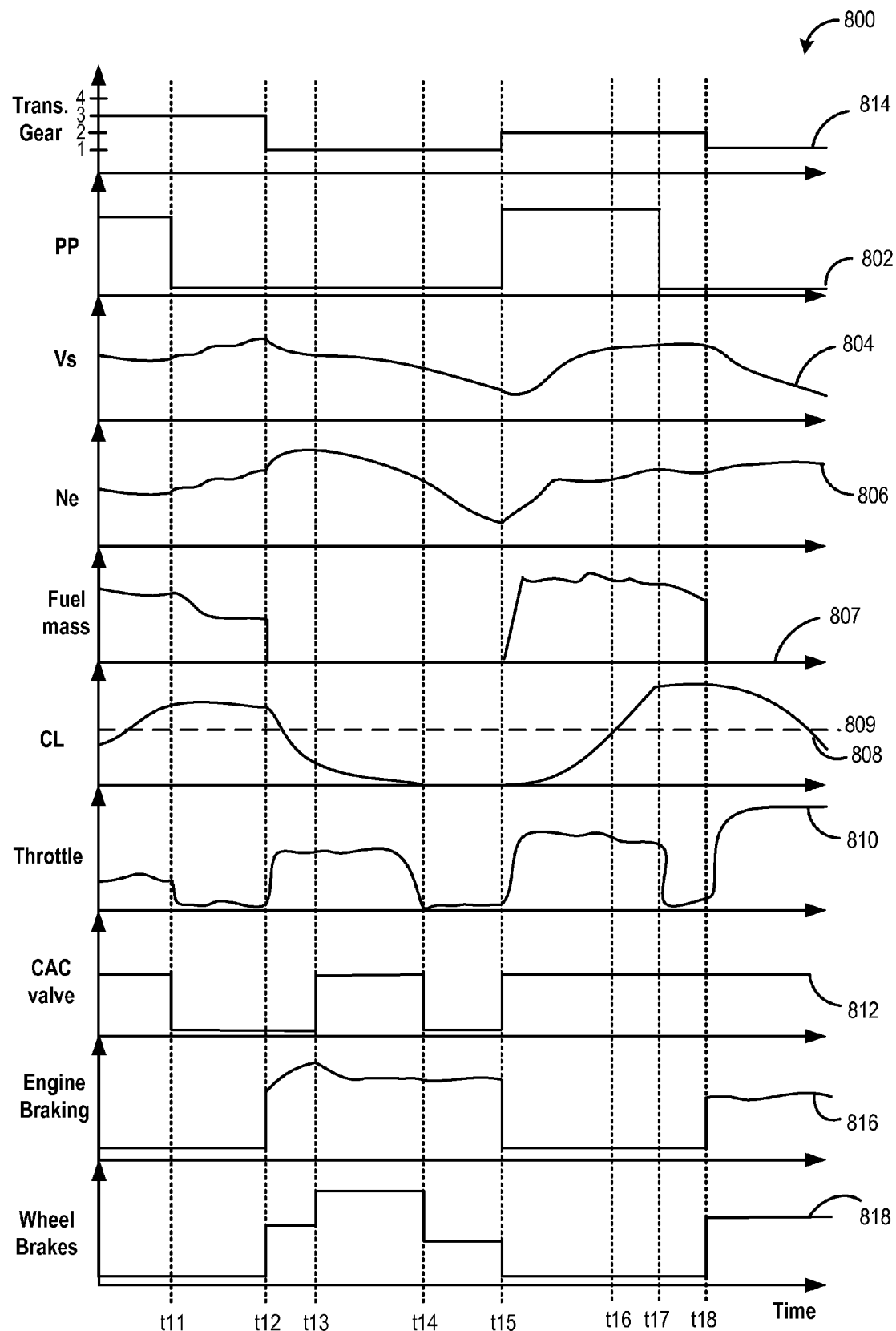

The following description relates to systems and methods for purging condensate from a charge air cooler (CAC) coupled to an engine system, such as the system of FIG. 1. Condensate purging may be performed opportunistically, during engine deceleration events when fueling of an engine cylinder is temporarily stopped, such as during a tip-out condition. Purging may be initiated during a deceleration event by downshifting a transmission gear to increase engine speed and manifold vacuum, drawing condensate from the CAC into the engine. Alternatively, if a lower gear is unavailable, condensate purging may be initiated by increasing airflow though the CAC. An engine controller may be configured to perform a control routine, such as the routine of FIG. 4, to open a valve coupled to the charge air cooler (FIGS. 2A-B and 3A-B) during a deceleration fuel shut off event to purge condensate to the engine intake during conditions when no cylinder combustion is occurring. Purge settings may be based on an amount of condensate stored at the CAC, as inferred from a model described at FIG. 5. During engine deceleration, an intake throttle opening may be temporarily increased to increase an intake air flow to the engine, further assisting in drawing the condensate into the engine. Additionally, condensate may be drawn into the engine from the CAC by downshifting a transmission gear to increase engine speed. An example control routine for purging CAC condensate to an engine intake during a deceleration event is shown at FIG. 6. Example purging operations are shown at FIGS. 7-8. In this way, condensate can be purged from a CAC during conditions when misfire events due to water ingestion are not likely.

FIG. 1 is a schematic diagram showing an example engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system 150. Further, a starter motor may be coupled to crankshaft 40 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque).

Vehicle speed may be reduced by engaging vehicle brakes (e.g., wheel brakes). Vehicle speed may be further reduced through engine braking. In some examples, engine braking may be utilized to slow the vehicle instead of wheel brakes. In this way, the use of wheel brakes may be reduced, increasing their lifespan. Engine braking may occur during a tip-out (e.g., deceleration event) when the engine spins, un-fueled. The controller may vary a transmission gear based on driving conditions, such as the deceleration event. For example, in response to a tip-out, when the engine is spinning un-fueled (e.g., during a deceleration fuel shut off or DFSO event) the vehicle may require engine braking in order to increase deceleration. By downshifting to a lower transmission gear, engine braking may be increased. As the transmission shifts to a lower gear, the engine speed (Ne or RPM) increases, increasing engine airflow. An intake manifold vacuum generated by the spinning engine may be increased at the higher RPM. As engine braking increases, a vehicle control system may coordinate and adjust the braking efforts of alternative vehicle brakes, such as the wheel brakes, to maintain a desired deceleration rate. For example, while the engine braking is temporarily increased, a wheel braking effort may be temporarily decreased.

However, if an air intake throttle is opened, such as during a CAC purging cycle, the vehicle may not receive the desired engine braking. In one example, alternative brakes (e.g., wheel brakes) may be applied to maintain a desired deceleration rate typically present during engine braking (when the throttle is closed). In another example, where the engine or drive-train is coupled to an electric machine (e.g., in a hybrid electric vehicle) or any other hybrid-like device (hydraulic or pneumatic), the throttle opening and transmission downshifting may be coordinated with such devices (e.g., the devices could be operated in an energy or torque absorbing mode) to maintain the desired deceleration rate while keeping engine speed and mass flow rate high (to continue purging the condensate during the deceleration). In this way, the controller may increase wheel brake torque, motor torque, or other torque-absorbing means while the throttle is open to maintain a desired deceleration rate.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. CAC 80 may be a variable volume CAC, such as shown in the embodiments of FIGS. 2A-B and 3A-B. In those embodiments, as described in more detail below, the charge air cooler 80 may include a valve to selectively modulate the amount and flow velocity of intake air traveling through the charge air cooler 80 in response to condensation formation within the charge air cooler as well as engine load conditions.

Hot charge air from the compressor 60 enters the inlet of the CAC 80, cools as it travels through the CAC, and then exits to enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be opportunistically purged into the engine during selected engine operating conditions, such as during acceleration or deceleration events. However, if the condensate is introduced at once into the engine during an acceleration event, it may increase the chance of engine misfire due to the ingestion of water.

Thus, as elaborated herein with reference to FIGS. 4-8, condensate may be purged from the CAC to the engine during conditions when the engine is not being fueled, such as during a DFSO event (fuel injection to engine cylinders is shut off). This purging during a DFSO may allow condensate to be delivered to the engine without causing misfire events. In one example, condensate purging during a DFSO may be initiated by downshifting a transmission gear with a concomitant opening of an air intake throttle to increase airflow through the CAC. By opening the intake throttle, a mass airflow through the engine can be increased, thereby increasing manifold vacuum and enabling more condensate to be drawn in. By downshifting the transmission while opening the intake throttle, an engine speed during the deceleration can be further increased, enabling the intake mass airflow to be further increased, and increasing the amount of condensate that can be purged during the deceleration event. In another example, when a lower gear is unavailable, condensate purging during DFSO may be initiated by increasing airflow through the CAC by adjusting one or more of an intake throttle, a CAC valve (shown in FIGS. 2A-B), and an intake manifold valve (shown in FIGS. 3A-B).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by microprocessor unit 102 for performing the methods described below as well as other variants that are anticipated but not specifically listed. Example routines are described herein at FIGS. 4-6.

Figure 2B:
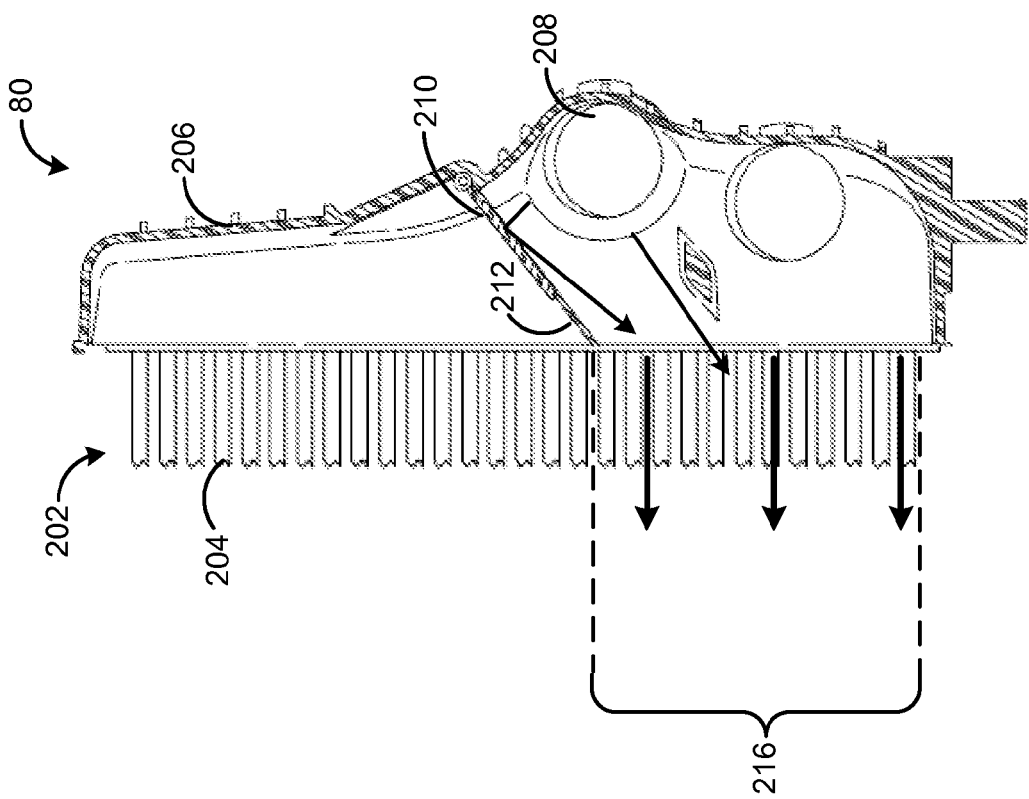
FIGS. 2A-B and 3A-B show example embodiments of a valve coupled to the charge air cooler for delivering condensate from the charge air cooler to an engine intake.
Figure 2A:
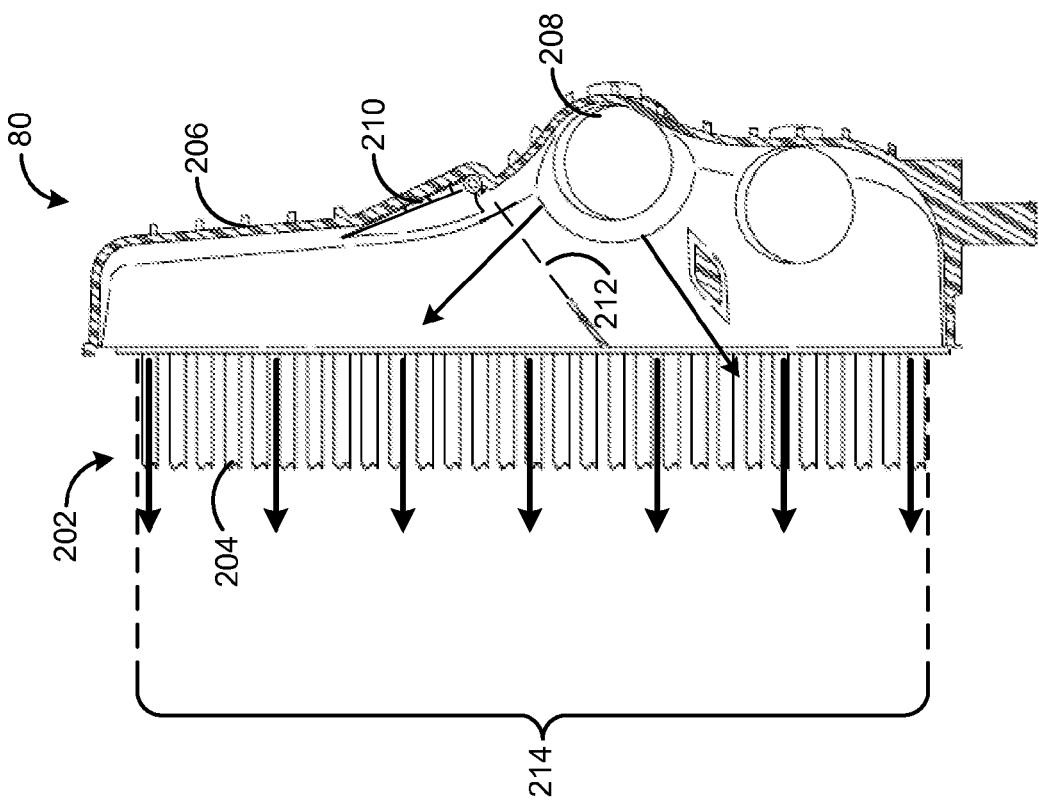

Turning now to FIGS. 2A and 2B, an inlet side of charge air cooler 80 is depicted. As depicted in both FIGS. 2A and 2B, charge air cooler 80 includes an operable thermal transfer area 202 configured to transfer heat from inside the charge air cooler 80 to outside of the charge air cooler 80. The charge air cooler 80 includes a plurality of cooling tubes 204 located in the thermal transfer area 202 of charge air cooler 80. The plurality of cooling tubes 204 are in fluidic communication with an inlet tank 206. Inlet tank 206 is configured to receive intake air via one or more inlet passages 208 coupled to an upstream region of an intake passage (not shown in FIGS. 2A and 2B). The intake air flows from the inlet tank 206 to the plurality of cooling tubes 204. After passing through the cooling tubes 204, the intake air is routed through an outlet tank (not shown) coupled to a downstream region of the intake passage.

Charge air cooler 80 may also include a charge air cooler valve 210 (CAC valve) configured to change the operable thermal transfer area from a first volume 214 (shown in FIG. 2A) comprising a relatively large area to second volume 216 (shown in FIG. 2B) comprising a relatively small area. CAC valve 210 may be configured as a flap, as shown. Inlet tank 206 may include a divider 212 that partitions inlet tank 206 into a first portion and a second portion. Divider 212 may include one or more holes. FIG. 2A depicts valve 210 in an open position. When valve 210 is open, intake air may pass through one or more holes of divider 212 such that intake air flows through both the first and second portions of inlet tank 206 and through the first volume 214 of the charge air cooler 80. Substantially all of the plurality of cooling tubes 204 may define the first volume 214. In one example, the charge air cooler 80 may include 21 cooling tubes, and the first volume 214 may include all 21 cooling tubes.

FIG. 2B depicts valve 210 in the closed position. When closed, valve 210 blocks the one or more holes of divider 212. Thus, intake air only flows through the first portion of the inlet tank 206 and through the second volume 216 of the charge air cooler 80. A portion of the plurality of cooling tubes 204 may define the second volume 216. The second volume 216 is contained wholly within the first volume 214. That is, the cooling tubes that comprise the second volume 216 also comprise a portion of the first volume 214. Therefore, when valve 210 is closed, intake air flows through only the second volume 216, and when valve 210 is open, intake air flows through the first volume 214, which contains the second volume 216. In one example, the charge air cooler 80 may include 21 cooling tubes, and the second volume 216 may include less than 21 cooling tubes. The second volume 216 may include less than half the cooling tubes that comprise the first volume 214, such as 9 cooling tubes.

CAC valve 210 may be, or may be similar to, a flapper valve. The valve 210 may include a seat member (e.g., divider 212) comprising a substantially flat stationary member having one or more holes there through. A closure member, for example a flap, or plate may be configured to move a first position spaced from the seat member thereby opening the one or more holes wherein intake air is able to flow into the first volume 214, to a second position adjacent to the seat member thereby closing the one or more holes wherein intake air is able to flow into only the second volume 216.

The divider 212 may be part of the valve 210. For example, the divider 212 may be a valve seat. The divider 212 may also be a dividing line or datum, or the like, functionally dividing the charge air cooler 80 into the two portions. Some embodiments may include two or more dividers dividing the inlet into three or more portions. In some examples one or more configurations described herein regarding the inlet tank 206 may instead, or in addition, be included in an outlet tank (not shown). Substantially all of the plurality of cooling tubes 204 may be in mutual fluidic communication with the outlet tank. It will be understood that instead, all the tubes may be in fluid communication on the inlet side and divided at the outlet side into two or more portions of tubes. A similarly configured valve may also be included in the outlet tank and function to control whether the fluid is allowed to pass or prevented from passing through a similarly configured hole.

Various embodiments may include an actuator (not illustrated) to open and to close the CAC valve 210. The actuator may be one or more of: an electronic actuator, a vacuum controlled actuator, a mechanical pressure diaphragm, a pulse-width modulated electronic control. When the inlet air is allowed to pass through all the tubes of the charge air cooler, i.e. when the valve is open, the inlet air will also experience a drop in pressure and the valve will be exposed on both sides to the pressure of the incoming inlet air. In this way the actuator may only need to provide a motive force to open and to close the valve in order to change the valve from an open state to a close state, but may not need to provide force to keep the flap open or to keep the flap closed.

Thus, by modulating a position of CAC valve 210, a volume and flow rate of intake air directed through the charge air cooler can be varied. In some embodiments, the valve may be mechanically modulated based on intake air flow, e.g., the valve flap or plate may be kept closed by spring tension that is calibrated to match air flow, such that the valve flap opens under conditions of high air flow. Thus, during low air flow conditions or low engine load conditions, the valve may be closed and the intake air may be directed through the second (smaller) volume of the charge air cooler, increasing the intake air flow velocity through the cooler to reduce condensation accumulation. In comparison, during high air flow conditions or high engine load conditions, the valve may be opened and intake air may be directed through the first (larger) volume of the charge air cooler. In other embodiments, the valve may be controlled by a controller, such as controller 12 of FIG. 1, based on various operating conditions. For example, the valve may be opened during low condensation formation conditions and commanded closed during conditions of high condensation formation.

Figure 4:
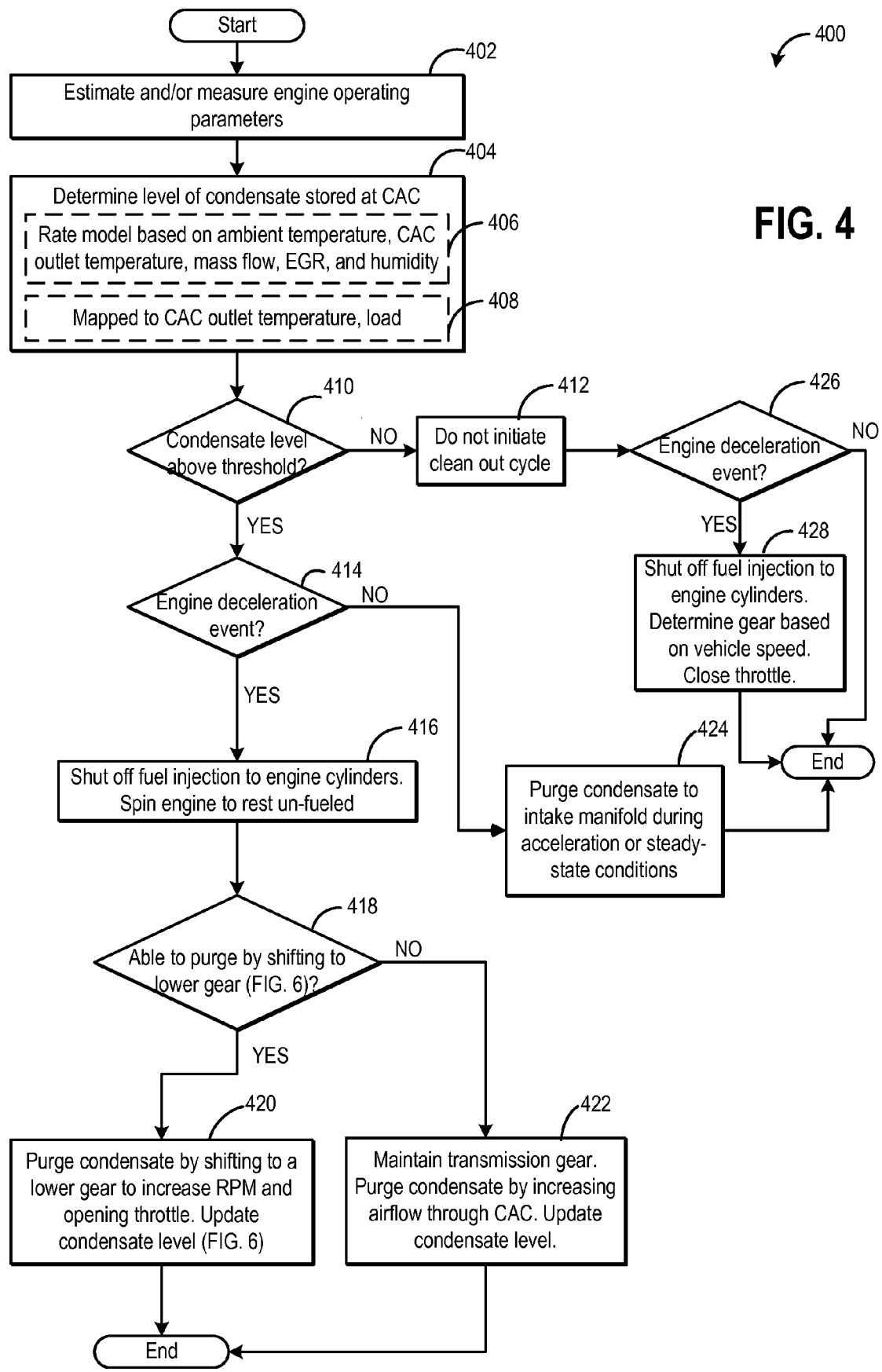
FIG. 4 shows a high level flow chart of a method for purging charge air cooler condensate to an engine intake during an engine deceleration event.

In addition, as elaborated herein at FIG. 4, an intake throttle and CAC valve 210 may be opened during a condensate purging routine to increase airflow through the CAC and thereby increase the amount of condensate purged from the CAC to the engine intake. The purging may be advantageously performed during a deceleration event (such as a DFSO) so as to ingest the water during conditions when cylinder combustion is not occurring. Alternatively, to clean the condensate during the deceleration, the CAC valve may be closed (to reduce the volume through the CAC) and an intake throttle opening may be increased to purge the smaller volume. Then, once the smaller volume has been purged, the CAC valve may be opened so that both partitions of the CAC can be cleaned. Further, while the intake throttle is opened (with the CAC valve open or closed, or in a CAC with no CAC valve), a transmission gear may be downshifted to increase engine speed and further increase air mass flow through the engine the CAC. Example purging operations that can be used for a variable volume CAC (such as shown in FIGS. 2A-B) or a non-variable volume CAC (such as shown in FIG. 1) are described herein with reference to FIGS. 7-8.

Figure 3A:
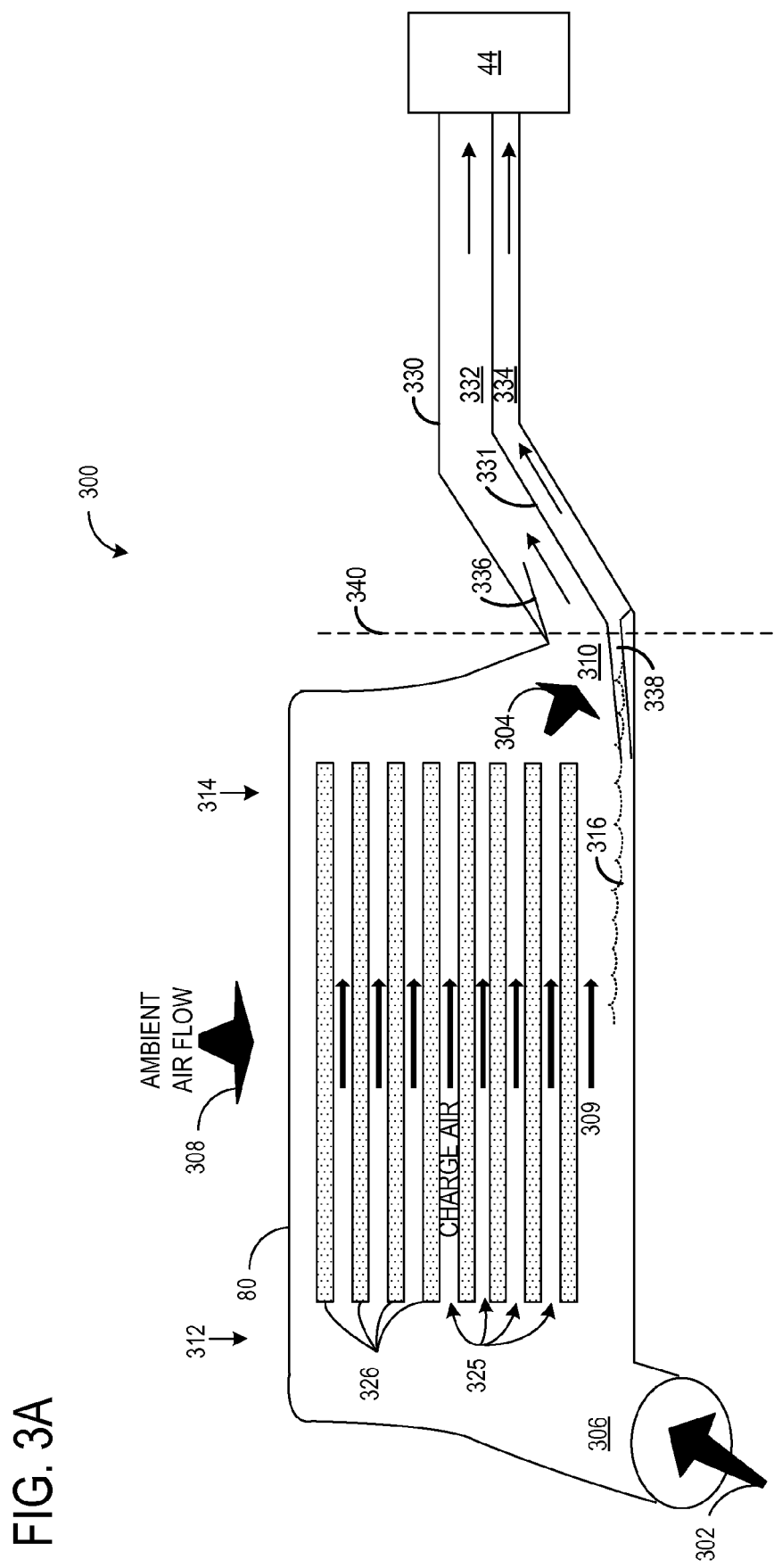
Figure 3B:
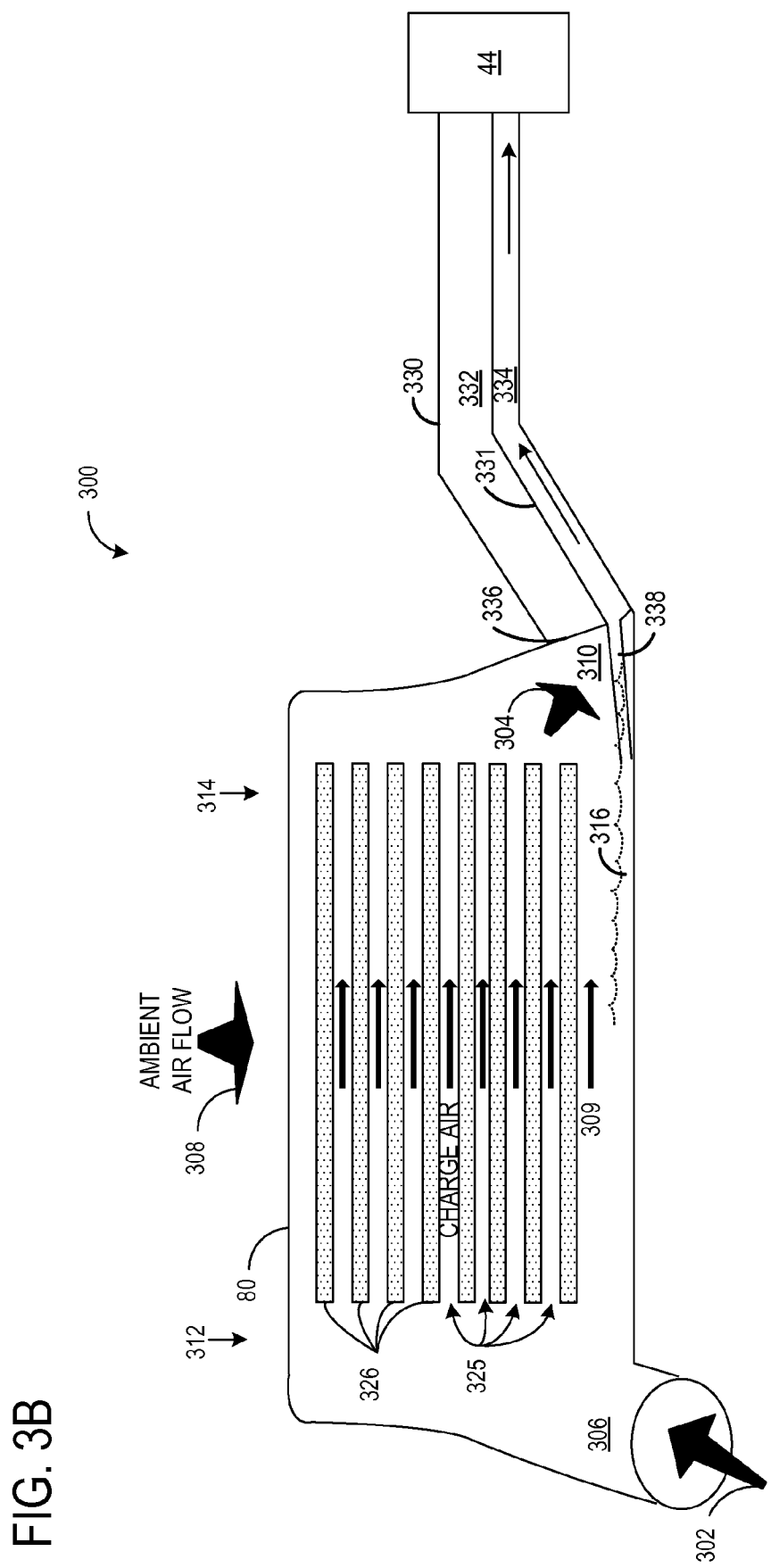

Referring now to FIGS. 3A and 3B, an alternate embodiment of a charge air cooling system is illustrated wherein the CAC includes a valve coupled between the outlet of the CAC and the intake manifold, herein also referred to as an intake manifold valve. In alternate embodiments, the valve may be coupled to an inlet of the CAC. FIGS. 3A and 3B show a front perspective view of a charge air cooler system 300 including a charge air cooler 80. The charge air cooler system may be utilized to discharge water droplets from the charge air cooler which may accumulate as the result of the high ambient air humidity. This may occur, for example, on surfaces of heat exchange passages within the charge air cooler when the surfaces are at a temperature less than the dew point of the ambient air entering the cooler. When condensation forms on these cooler surfaces it may pool at a low point of the charge air cooler, for example.

As shown, the direction of engine airflow entering charge air cooler 80 is indicated generally by arrow 302, and engine airflow exiting charge air cooler 80 is indicated generally by arrow 304. However, it will be appreciated that engine air may enter and exit charge air cooler 80 at other airflow directions and the engine airflow as indicated by arrows 302 and 304 is provided as one non-limiting example. Likewise, other charge air cooler geometries than those depicted in FIGS. 3A and 3B are possible without departing from the scope of this disclosure.

As introduced above, engine air may enter via a first engine air passage 306 upstream from charge air cooler 80. Engine air may then be cooled via heat exchange with ambient air, indicated generally at 308, and may then exit via a second engine air passage 310 downstream from charge air cooler 80. In other words, engine air enters at a hot side 312 of the charge air cooler and exits at a cold side 314 of the charge air cooler (directionality of charge air flow indicated generally by arrows 309), wherein 'hot' and 'cold' indicate a relative temperature of the engine air as it passes through the charge air cooler. In this way, ambient air 308 cools compressed engine air via heat exchange as the engine air passes through the charge air cooler. However, the compressed engine air entering the charge air cooler may condense, as described above. In this sense, first engine air passage 306 may deposit condensate within the charge air cooler.

As shown, charge air cooler 80 may include a plurality of heat exchange passages 325 and a plurality of ambient air passages 326. Heat exchange passages 325 may provide a conduit for charge air to be cooled by ambient air cross-flow passing through the plurality of ambient air passages 326. In this way, compressed engine air is cooled upstream from the combustion chambers.

Charge air cooler system 300 also includes a conduit 330 coupled to the second engine air passage 310. Conduit 330 leads to the intake manifold 44 of the engine. Thus, conduit 330 is coupled to both charge air cooler 80 and intake manifold 44. As conduit 330 is configured to deliver intake air to the engine, it may be referred to as an intake passage. Conduit 330 includes a divider 331 that portions conduit into two air flow paths, first flow path 332 and second flow path 334. Divider 331 may run the entire length of conduit 330 and act as a common interior dividing wall that is shared between the first and second flow paths. Thus, conduit 330 may be fully divided the entire length from the charge air cooler to the intake manifold, and in some embodiments, without any intervening openings. Both air flow paths are fluidically coupled to the charge air cooler 80 and to the intake manifold 44 such that charge air from the charge air cooler 80 may travel through both first flow path 332 and second flow path 334 to reach the intake manifold 44. As shown in FIGS. 3A and 3B, first flow path 332 is vertically above second flow path 334. A vertical axis 340 is depicted in FIG. 3A to illustrate the relationship between the first flow path 332 and the second flow path 334. As used herein, vertical is with respect to the ground and the wheels of the vehicle in which charge air cooling system 300 is installed. Furthermore, as depicted in FIGS. 3A and 3B, first flow path 332 has a larger cross-section diameter than second flow path 334. However, in other embodiments, second flow path 334 may have a larger diameter, or the flow paths may have equal diameters.

First flow path 332 may be selectively opened by a valve 336 positioned across the first flow path 332. As illustrated herein, valve 336 is positioned at the inlet of first flow path 332 where conduit 330 is coupled to charge air cooler 80. However, valve 336 may be positioned at other suitable locations. In one example, valve 336 may be positioned in second flow path 334 rather than first flow path 332. In another example, valve 336 may be positioned at a different location within first flow path 332, such as in the middle of conduit 330, at the outlet of the conduit 330, inlet of the intake manifold 44, etc.

Valve 336 may be a spring-loaded flapper valve configured to be closed under low to mid load conditions and opened under high load conditions. For example, the spring tension acting on valve 336 may be high enough to maintain valve 336 in a closed position when charge air velocity is relatively low (e.g., under lower load conditions). When charge air velocity is relatively high (e.g., under high load conditions), the higher velocity of the charge air acting on the spring may force the valve 336 open. FIG. 3A shows the valve 336 in the open position, with charge air flowing to the intake manifold 44 via both first flow path 332 and second flow path 334.

When closed, valve 336 may act to block first flow path 332 from receiving charge air, thus directing all charge air through second flow path 334, as shown in FIG. 3B. In doing so, the velocity of charge air traveling through the second flow path 334 increases. The increased air velocity entrains condensate that has accumulated on the bottom surface of the charge air cooler 80. For example, accumulated condensate 316 may pool at a low point of charge air cooler 80, such as along the bottom surface of charge air cooler. Accumulated condensate 316 may also pool along surfaces of the heat exchange passages 325 and/or at collections point in conduit 330 (such as bends). This condensate may be swept out of the charge air cooler under high velocity conditions, such as high load. However, during lower load conditions, the velocity of the charge air may not be high enough to move the accumulated condensate. By selectively closing off part of the flow path from the charge air cooler 80 to the intake manifold 44 with the closed valve 336 (e.g., by selectively closing off first flow path 332), the increased velocity of the charge air traveling through the second flow path 334 may remove the condensate, even during lower load conditions. During high load conditions, when charge air velocity is higher, a closed valve 336 may present a large pressure drop, hindering efficient flow. Thus, valve 336 is configured to open under high load conditions.

Also depicted in FIGS. 3A and 3B is a condensation collection tube 338. Condensation collection tube 338 may be coupled to the second flow path 334 and include an inlet positioned near a low point of the charge air cooler 80. The condensation collection tube 338 may further narrow the flow path of charge air exiting the charge air cooler 80. In this way, condensation collection tube 338 may act as a straw to funnel charge air with entrained condensate into the second flow path 334 and to the intake manifold 44.

It will be appreciated that the above description is non-limiting and components of the charge air cooler system 200 may be of other suitable geometric configurations than those depicted in FIGS. 3A and 3B. Additionally, it will be appreciated that features of charge air cooler system 300 may embody configurations other than those depicted without departing from the scope of this disclosure. For example, condensation collection tube 338 may be omitted, or it may be coupled to first flow path 332 rather than second flow path 334. Further, while valve 336 is depicted as a spring-loaded flapper valve configured to open or close based on the velocity of the charge air, other valve configurations are possible. In one example, valve 336 may be controlled by controller 12 to selectively open or close based on engine operating conditions. Valve 336 may be an on-off valve with a fully open and fully closed position, or it may be a continuously variable valve with a plurality of restriction points. Further, in alternate embodiments, the valve may be coupled to an inlet of the CAC rather than the outlet.

In another example, more than two flow paths are possible. The conduit may contain three or more flow paths, and one or more of the flow paths may be controlled via a valve as described above. Alternatively, only one flow path may be provided, and the valve may be configured as a variable position valve that can regulate the restriction level of the opening of the flow path to change the velocity of the air traveling through the conduit.

As shown in FIGS. 3A and 3B, divider 331 runs the entire length of conduit 330, from the outlet of charge air cooler 80 to in the inlet of intake manifold 44. As such, first flow path 332 and second flow path 334 share a common interior dividing wall. Further, in some embodiments, no components (other than valve 336), additional flow paths, or openings are positioned within conduit 330, and thus first and second paths 332, 334 extend from charge air cooler 80 to intake manifold 44 without interruption. However, in other embodiments, additional components may be positioned between the charge air cooler and the intake manifold, such as throttles, various sensors, another turbocharger, additional charge air cooler, etc. If additional components are present, the conduit between the charge air cooler and downstream component may include multiple flow paths while the conduit from the downstream component to the intake manifold may only include one flow path, or the conduit from the downstream component to the intake manifold may also include multiple flow paths.

Thus, by modulating a position of intake manifold valve 336, a volume and velocity of intake air directed through a conduit between the charge air cooler and the intake manifold can be varied. Thus, during low engine load conditions, the valve may be closed and the intake air may be directed through a smaller volume of the conduit, increasing the intake air flow velocity through the cooler. In comparison, during high engine load conditions, the valve may be opened and the intake air may be directed through a larger volume of the conduit, decreasing the intake air flow velocity through the cooler. In another embodiment, the ratio of charge air cooler pressure to ambient pressure may be used in place of engine load to control the position of intake manifold valve 336. In other embodiments, the valve may be controlled by a controller, such as controller 12 of FIG. 1, based on various operating conditions. For example, the valve may be open during low condensation formation conditions and commanded closed during conditions of high condensation formation.

In addition, as elaborated herein at FIG. 4, intake manifold valve 336 and an intake throttle may be opened during a condensate purging routine to increase airflow through the CAC and thereby increase the amount of condensate purged from the CAC to the engine intake. The purging may be advantageously performed during a deceleration event (such as a DFSO) so as to ingest the water during conditions when cylinder combustion is not occurring. Alternatively, to clean the condensate during the deceleration, the intake manifold valve may be closed (to increase the velocity of air through the CAC) and an intake throttle opening may be increased to purge the smaller volume. Then, once the smaller volume has been purged, the intake manifold valve may be opened so that both partitions of the CAC can be cleaned. Further, while the intake throttle is opened (with the intake manifold valve open or closed, or in a CAC with no intake manifold valve), a transmission gear may be downshifted (if a lower gear is available) to increase engine speed and further increase air mass flow through the engine the CAC. Example purging operations that can be used for a variable volume CAC (such as shown in FIGS. 3A-B) or a non-variable volume CAC (such as shown in FIG. 1) are described herein with reference to FIGS. 7-8.

It will be appreciated that while the embodiments of FIGS. 2A-B and 3A-B show the charge air cooler with a flapper valve, in still other embodiments, the charge air cooler (CAC) may not have a valve coupled thereto. In those embodiments, to enable purging of condensate during a deceleration event, an air intake throttle may be opened (instead of being closed) to increase airflow through the CAC. Additionally, the air intake throttle may be temporarily opened with a concomitant temporary transmission gear downshift (such as a gear downshift used in towing modes to increase engine braking). For example, the transmission gear may be downshifted from a transmission third gear to a transmission first gear. By opening the intake throttle and downshifting a transmission gear, a mass air flow rate though the engine and the CAC may be increased and the resulting increase in manifold vacuum can be advantageously used during the deceleration event to draw in and purge more condensate from the CAC. In one example, the temporary opening of the intake throttle during a deceleration event (such as during a DFSO) may be performed for a few seconds. As such, since the throttle opening and transmission gear downshift affects engine braking, a vehicle control system may coordinate and adjust the braking efforts of alternate vehicle brakes (e.g., wheel brakes) to maintain a desired deceleration rate. For example, while the engine braking is temporarily increased, a wheel braking effort may be temporarily decreased. As another example, in embodiments where the engine or drive-train is coupled to an electric machine (e.g., in a hybrid electric vehicle) or any other hybrid-like device (hydraulic or pneumatic), the throttle opening and transmission downshifting may be coordinated with such devices (e.g., the devices could be operated in an energy or torque absorbing mode) to maintain the desired deceleration rate while keeping engine speed and mass flow rate high (to continue purging the condensate during the deceleration). Additional details on purging during a DFSO by downshifting a transmission gear are presented at FIGS. 4 and 6.

In another embodiment, purging condensate during a DFSO by opening an intake throttle with concomitant temporary transmission gear downshift may also be performed with the CAC embodiments shown in FIGS. 2A-B and 3A-B. By coordinating opening of the CAC or intake manifold valve with the increased airflow from the open throttle and increased RPM from downshifting a transmission gear, airflow through the CAC may be further increased to increase purging of condensate. In one example, during the DFSO and gear downshift, the CAC valve may be opened to increase airflow through the CAC and thereby increase the amount of condensate purged from the CAC to the engine intake. In another example, during the DFSO and gear downshift, the intake manifold valve may be opened to increase airflow through the CAC and provide additional condensate purging. In this way, the combined increase in airflow (from opening one or more valves) and manifold vacuum (from increased RPM) may allow a larger amount of condensate to be purged from the CAC. The condensate may also be purged more quickly. In this way, combining increased airflow with increased manifold vacuum may increase the efficiency of purging condensate form the CAC during a DFSO event.

In some embodiments, downshifting a transmission gear may be in response to a vehicle speed. In other embodiments, downshifting a transmission gear may be in response to vehicle speed and condensate level in a CAC. In one example, the vehicle may downshift the transmission from a first higher gear to a second lower gear in response to decreasing vehicle speed during a deceleration event. In another example, during a deceleration event, the vehicle may downshift the transmission from a first higher gear to a second lower gear in response to the condensate level in the CAC being above a threshold. In some cases, the second gear may be selected based on the condensate level in the CAC. For example, the second gear may be a lower gear (with a higher gear ratio) as condensate level in the CAC increases. In this way, downshifting to a gear with a higher gear ratio may increase manifold vacuum, allowing more condensate to be purged from the CAC. For example, downshifting from a transmission fourth gear to a transmission first gear may purge a greater amount of condensate than downshifting from a transmission fourth gear to a transmission third gear.

Selectively downshifting a transmission from a first, higher gear to a second, lower gear during a deceleration event may be based on the first gear (that is, the gear the transmission is already in at the time when deceleration occurs and purging is requested) and the amount of condensate in the CAC. In one example, downshifting may only occur when the first transmission gear is above a threshold gear. Downshifting from this threshold gear may correspond to an increase in engine speed and airflow through the CAC necessary to purge a given amount of condensate from the CAC. For example, the downshifting may occur only if the transmission is already in or above a transmission third gear (e.g., in a transmission third gear or fourth gear or fifth gear, etc.). In this example, downshifting from the transmission third gear to the transmission first gear may increase engine speed to a first level. This first level may increase airflow through the CAC such that all the condensate in the CAC is purged. If engine speed does not reach this level, due to the first gear being below the threshold gear, all the condensate may not be purged from the CAC. Thus, an increase in engine speed to purge an amount of condensate from the CAC may determine the threshold gear for downshifting. In another example, downshifting may only occur if a gear difference between the first and second gear is higher than a threshold difference. These thresholds may be based on the lowest possible gear in the given transmission configuration or the condensate level in the CAC. For example, if the first gear which the transmission is already in is a transmission first gear, a lower gear may not be available and downshifting may not be possible. In this case, the threshold gear may be the transmission first gear. However, if the first gear the transmission is in is a transmission third gear, a lower gear may be available and downshifting may be possible. In this case, the threshold gear may be the transmission second gear and the downshifting is enabled because the transmission is already in a gear that is above the transmission second gear.

In another example, downshifting from a transmission fourth gear to a transmission second transmission gear may purge the condensate in the CAC. However, shifting from a transmission second gear to a transmission first gear may not be enough to purge the condensate if the condensate level in the CAC is high. In this case, the threshold gear may be the transmission second gear and the threshold difference may be two transmission gears. That is, the transmission may need to be downshifted by at least 2 gears to enable sufficient purging. In this way, the threshold gear and/or a threshold difference (in gears) required for enabling downshifting may increase as the level of condensate in the CAC increases.

In this way, the vehicle control system may selectively downshift a transmission from a first, higher gear to a second, lower gear to increase engine speed and increase engine airflow to purge condensate from a CAC. By concomitantly increasing the opening of an intake throttle, airflow through the CAC may be further increased, increasing condensate purging. The amount of opening of the intake throttle may be based on the amount of downshift (e.g., difference between the first and second gear of the downshift) and the amount of condensate in the CAC. For example, during a larger downshift (e.g., going from a transmission fourth to a transmission first gear) the throttle may be opened by a smaller amount to aid in purging. Alternatively, during a smaller downshift (e.g., going from a transmission second gear to a transmission first gear) the throttle may be opened by a larger amount to aid in purging. In this way, if the condensate level in the CAC requires a larger downshift, but the gear difference between the first and second gears is not higher than the threshold difference, condensate purging may still proceed by utilizing a larger throttle opening. For example, the vehicle may be in a transmission second gear while the threshold difference (based on condensate level) is two transmission gears. Purging may proceed by opening the throttle (possibly all the way) and downshifting from the transmission second gear to the transmission first gear. In some cases, this may allow a similar amount of condensate to be purged as during the larger downshift and smaller throttle opening. In other cases, a smaller amount of condensate than the amount in the CAC may be purged. However, a smaller amount of condensate purging may be enough to decrease condensate levels in the CAC to a safer level (less chance of engine misfire).

It will be appreciated that the purging routines described herein enable condensate to be purged from various embodiments of a CAC to an engine intake during a deceleration event. These may include a variable volume CAC (such as those described at FIGS. 2A-B and 3A-B) as well as other conventional CAC embodiments, such as a non-variable volume CAC as described at FIG. 1.

Now turning to FIG. 4, an example method 400 is shown for purging condensate from a charge air cooler to an engine intake. By opportunistically purging during deceleration events when the engine is not being fueled, misfire events rising from water ingestion can be reduced.

At 402, the method includes estimating and/or measuring engine operating conditions. These may include, for example, engine speed, MAP, MAF, BP, engine temperature, catalyst temperature, ambient conditions (temperature, humidity, etc.), charge air cooler conditions (inlet temperature, outlet temperature, inlet pressure, outlet pressure, flow rate through the cooler, etc.), EGR, torque demand, etc.

At 404, the level of condensate at the CAC may be determined. This may include retrieving details such as ambient air temperature, ambient air humidity, inlet and outlet charge air temperature, inlet and outlet charge air pressure, and air mass flow rate from a plurality of sensors and determining the amount of condensate formed in the CAC based on the retrieved data. In one example, at 406, and as further elaborated at the model of FIG. 5, the rate of condensate formation within the CAC may be based on ambient temperature, CAC outlet temperature, mass flow, EGR, and humidity. In another example, at 408, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

At 410, the method includes determining if the condensate level at the CAC is higher than a threshold. As such, the threshold may correspond to an amount of condensate above which purging of the condensate is required to reduce misfire resulting from the slow burn rate in the engine induced by the water ingestion. If the condensate level is not above the threshold, the routine proceeds to 412 wherein a clean-out cycle (or condensate purging routine) is not initiated. At 426, the routine determines if there is an engine deceleration event. If there is no deceleration event, the routine ends. However, in response to an engine deceleration event, the routine includes shutting off fuel injection to the engine cylinders, determining which gear to shift to, based on vehicle deceleration, and closing the throttle. Closing the throttle during a deceleration event (DFSO) decreases oxygen saturation levels in the catalyst and decreases cooling of the catalyst. Thus, when condensate is not being purged from the CAC during a DFSO event, the throttle may close.

Upon confirming that condensate levels are sufficiently high to necessitate purging, at 414, the routine includes confirming if there is an engine deceleration event. In one example, the engine deceleration event may include a tip-out (that is, where the operator has released an accelerator pedal and requested a decrease in torque). If an engine deceleration event is confirmed, then at 416, the routine includes shutting off fuel injection to the engine cylinders and spinning the engine un-fueled. Herein, the engine may continue to be spun via the vehicle wheels. Thus, the deceleration event includes a DFSO event following the tip-out.

At 418, the method includes determining if the condensate may be purged from the CAC by shifting to a lower gear. The ability to purge by shifting to a lower gear may be based on the current transmission gear and the condensate level in the CAC. If the first gear is not higher than a threshold gear or the difference between the first and second gear is not higher than a threshold difference, purging by shifting to a lower gear may not be possible. A method for determining this is presented at FIG. 6. At 422, in response to the engine deceleration event and the inability to purge by shifting to a lower gear (for example, if the transmission is already in a gear that is lower than a threshold gear), delivery of condensate from the CAC to the engine intake may be initiated by increasing airflow through the CAC (and engine). In particular, airflow is increased while engine cylinder fuel injection is deactivated, while the engine is spinning, and while cylinder valves are still active. At the same time, the transmission gear is maintained.

As one example, this may include opening a valve or flap coupled to the charge air cooler (herein also referred to as a CAC valve) while also opening an intake throttle to release condensate from the CAC into the engine intake manifold. As another example, a valve or flap coupled in a conduit between the outlet (or inlet) of the charge air cooler and the engine intake manifold (herein also referred to as an intake manifold valve) may be opened while also opening the intake throttle to release condensate from the CAC into the engine intake manifold. In either case, by opening the valve, an intake manifold vacuum generated by the spinning engine may be used to draw in condensate from the CAC into the engine along the intake manifold.

In still another example, increasing the airflow to the engine and the CAC includes opening an air intake throttle (such as in embodiments of a CAC that does not have a variable volume), or increasing the opening of an air intake throttle, to increase mass airflow rate through the CAC and engine, thereby assisting in the purging of condensate to the intake manifold. As referred to herein, the air intake throttle may refer to an intake throttle positioned in the intake manifold downstream of a compressor (such as intake throttle 21 of FIG. 1). By increasing the air flow to the engine, engine spinning may be maintained, an intake manifold vacuum may be increased, and more condensate may be purged during the deceleration.

In one example, the air intake throttle may be maintained in the open position (e.g., the fully open position) during the purging. In another example, the opening of the throttle and the increasing airflow is adjusted further responsive to an amount of condensate stored in the CAC. For example, the opening of the intake throttle may be increased as the amount of condensate in the CAC exceeds a threshold amount. In addition, the increasing airflow can be continued for a duration until the amount of condensate in the CAC is below the threshold amount. In a further example, an opening of the throttle may be adjusted during the purging based on an engine speed to maintain a threshold amount of intake vacuum for the purging. Thus, as the engine speed decreases during the deceleration event, an opening of the intake throttle may be (further) increased to maintain the threshold vacuum. As such, once the engine speed drops below a threshold, below which further throttle adjustments may not maintain the intake manifold vacuum, throttle adjustments and further condensate purging may be discontinued.

In still further embodiments, the intake throttle may be opened during the deceleration event in response to the CAC condensate level being higher than the threshold level while the CAC valve or intake manifold valve is maintained closed, for a duration. For example, to clean the condensate during the deceleration, the CAC valve may be closed to reduce the volume of the CAC, and the intake throttle opening may be increased to increase air flow through the engine and CAC, thereby enabling purging of the smaller volume of the CAC. Then, once the smaller volume has been sufficiently purged, with the intake throttle maintained open, the CAC valve may be opened so that the (larger volume of) the CAC can be completely cleaned.

As yet another example, to clean the condensate during the deceleration, the intake manifold valve may be closed to reduce the volume of a conduit coupled between the CAC and the intake manifold. In doing so, the volume of purging at the CAC is decreased and the airflow velocity through the conduit is increased. At the same time, the intake throttle opening may be increased to purge the smaller volume. Then, once the smaller volume has been sufficiently purged, the intake manifold valve may be opened so that the CAC can be completely cleaned.

In this way, while increasing the opening of the intake throttle, a valve coupled to the charge air cooler (the CAC valve or the intake manifold valve) may be maintained closed to reduce a purge volume of the charge air cooler. Then, after purging the reduced volume of the charge air cooler, the valve may be opened.

Returning to 418, if the condensate may be purged by shifting to a lower gear (for example, if the transmission is already in a gear that is higher than a threshold gear), the routine proceeds to 420. Herein, the routine downshifts a transmission gear (e.g., from a transmission third gear to a transmission first gear) to increase RPM and begin purging condensate from the CAC. By increasing engine RPM during a DFSO event, condensate may be pulled out of the charge air cooler and into the engine, without causing misfire events. An intake manifold vacuum generated by the spinning engine may be increased at the higher RPM and used to draw in more condensate from the CAC into the engine along the intake manifold. The routine at 420 may also open the throttle to increase airflow through the charge air cooler to aid in the purging. By opening the intake throttle and downshifting a transmission gear, a mass air flow rate though the engine and the CAC may be temporarily increased during the deceleration event to draw in and purge more condensate from the CAC.

In one example, the temporary opening of the intake throttle during a deceleration event (such as during a DFSO) may be performed for a few seconds. As such, since the throttle opening and transmission gear downshift affects engine braking, a vehicle control system may coordinate and adjust the braking efforts of alternate vehicle brakes (e.g., wheel brakes) to maintain a desired deceleration rate. As such, during a CAC purging routine that occurs during deceleration with the fuel shut off, when the intake throttle is opened to increase mass air flow rate, the vehicle may not get sufficient engine braking, and therefore an alternate braking effort may need to be applied in order to maintain the desired deceleration rate typically present when there is closed throttle engine braking. For example, in embodiments where the engine or drive-train is coupled to an electric machine (e.g., in a hybrid electric vehicle) or any other hybrid-like device (hydraulic or pneumatic), the throttle opening and transmission downshifting may be coordinated with such devices (e.g., the devices could be operated in an energy or torque absorbing mode) to maintain the desired deceleration rate while keeping engine speed and mass flow rate high (to continue purging the condensate during the deceleration). For example, the wheel braking torque or the motor braking torque may be increased. After purging is completed, the condensate level is updated and the routine ends. Additional details on purging condensate during a DFSO by downshifting are presented at FIG. 6.

Returning to 414, if an engine deceleration event is not confirmed, the routine proceeds to 424 to purge the condensate during acceleration or steady-state conditions. Clean-out routines during these conditions may include controlling a throttle opening and engine airflow while adjusting engine actuators to maintain torque.

As such, by delivering condensate from a charge air cooler to an engine during a deceleration event, the large amount of intake manifold vacuum generated from the engine braking can be advantageously used to draw condensate into the engine. Further, by delivering the condensate to the engine during conditions when cylinder combustion is not occurring, the condensate can pass through the engine system without degrading combustion stability. Further still, since the likelihood of poor combustion or misfire due to water ingestion is reduced by purging the condensate while no combustion is occurring, concurrent engine actuator adjustments for misfire control may not be required. As such, this may enable a larger amount of condensate to be purged into the engine. In one example, a larger amount of condensate may be purged per cycle during the deceleration event (e.g., during a tip-out) as compared to the amount of condensate purged per cycle during an acceleration event (e.g., during a tip-in).

In this way, during engine deceleration with fuel injection to an engine cylinder deactivated, airflow through a charge air cooler can be increased based on an amount of condensate stored in the charge air cooler. By increasing airflow through the engine during a deceleration when the amount of condensate stored in the charge air cooler is higher, a large amount of condensate can be advantageously drawn in to the intake manifold during non-combustion cylinder conditions enabling purging to be accomplished with reduce risk of misfires. In comparison, during a deceleration when the amount of condensate stored in the charge air cooler is lower, airflow through the engine may be decreased.

Figure 5:
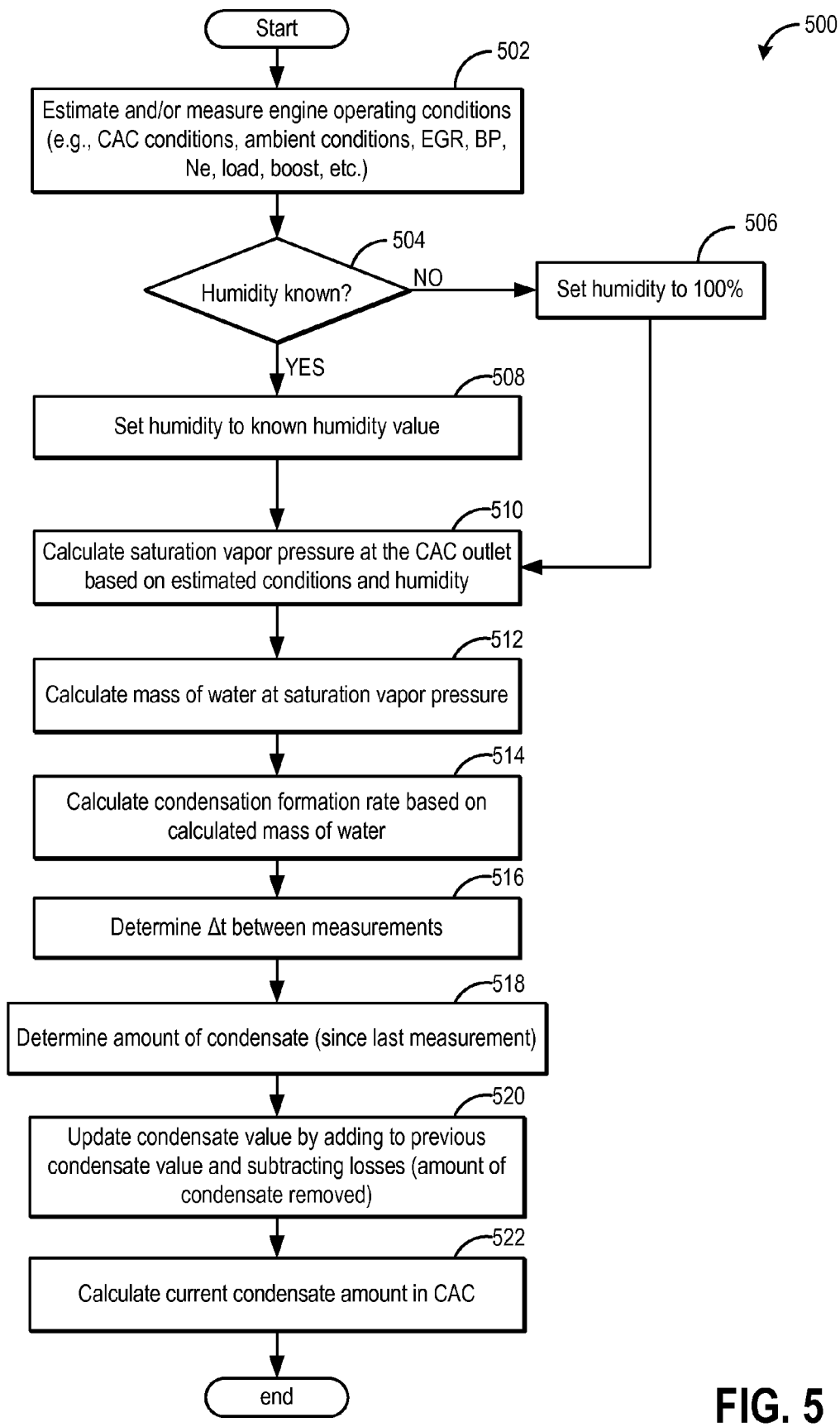
FIG. 5 shows a flow chart illustrating a method for inferring a condensate level at the charge air cooler.

FIG. 5 illustrates a method 500 for estimating the amount of condensate stored within a CAC. Based on the amount of condensate at the CAC relative to a threshold value, condensate purging routines, such as those discussed at FIG. 4, may be initiated.

The method begins at 502 by determining the engine operating conditions. These may include, as elaborated previously at 402, ambient conditions, CAC conditions (inlet and outlet temperatures and pressures, flow rate through the CAC, etc.), mass air flow, MAP, EGR flow, engine speed and load, engine temperature, boost, etc. Next, at 504, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100% at 506. However, if the humidity is known, the known humidity value, as provided by the humidity sensor, may be used as the humidity setting at 508.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 510, an algorithm may calculate the saturation vapor pressure at the CAC outlet as a function of the CAC outlet temperature and pressure. The algorithm then calculates the mass of water at this saturation vapor pressure at 512. Finally, the condensation formation rate at the CAC outlet is determined at 514 by subtracting the mass of water at the saturation vapor pressure condition at the CAC outlet from the mass of water in the ambient air. By determining the amount of time between condensate measurements at 516, method 500 may determine the amount of condensate within the CAC since a last measurement at 518. The current condensate amount in the CAC is calculated at 522 by adding the condensate value estimated at 518 to the previous condensate value and then subtracting any condensate losses since the last routine (that is, an amount of condensate removed. for example, via purging routines) at 520. Condensate losses may be assumed to be zero if the CAC outlet temperature was above the dew point. Alternatively, at 520, the amount of condensate removed may be modeled or determined empirically as a function of air mass and integrated down with each software task loop (that is, with each run of routine 500).

As such, the method of FIG. 5 may be used by the controller during the routine of FIG. 4 to use a modeling method for estimating the amount of condensate at the CAC. In alternate embodiments, the engine control system may use a mapping method to map the amount of condensate at the CAC to a CAC inlet/outlet temperature, an ambient humidity, and an engine load. For example, the values may be mapped and stored in a look-up table that is retrieved by the controller during the routine of FIG. 4 (at 408), and updated thereafter.

Turning now to FIG. 6, an example method 600 is shown for purging condensate from a CAC to an engine intake during a deceleration event by downshifting a transmission from a first, higher gear to a second, lower gear. By downshifting a transmission gear, opening an air intake throttle, and possibly opening a CAC valve or an intake manifold valve, a larger amount of condensate may be purged from the CAC.

At 602, the method includes estimating and/or measuring engine operating conditions. These may include, for example, engine speed, MAP, MAF, BP, engine temperature, catalyst temperature, ambient conditions (temperature, humidity, etc.), CAC conditions (inlet temperature, outlet temperature, inlet pressure, outlet pressure, flow rate through the cooler, etc.), EGR, torque demand, transmission conditions (current transmission gear, presence of engine breaking, etc.), etc.

At 603, the routine determines the required downshift based on CAC condensate level. This may include determining a threshold gear for the first, higher transmission gear. Specifically, the first gear may need to be at or above the threshold gear to purge an amount of condensate. The method at 603 may also include determining a threshold difference between the first and second gear. Specifically, the difference between the first and second gear may need to be at or higher than a threshold difference to purge an amount of condensate. Thus, these thresholds may be based on the amount of condensate in the CAC. For example, if there is a large amount of condensate in the CAC, a larger downshift (or higher threshold difference between the first and second gear) may be required. This larger downshift may involve skipping gears (e.g., going from a third to a first gear). In another example, a smaller amount of condensate in the CAC may require a smaller downshift (e.g., downshifting from a second to a first transmission gear). As such, the method may include skipping gears to a greater or lesser degree in response to the amount of condensate in the CAC.

At 604, the routine determines if the required downshift determined at 603 is possible. For example, if the vehicle is in a transmission third gear and the threshold difference is two transmission gears, the method may proceed to 606. However, if the vehicle is in a transmission second gear, purging by downshifting may not be possible. If the required downshift is not possible, the routine continues to 608 where the transmission gear is maintained and CAC condensate purging is initiated. Delivery of condensate from the CAC to the engine intake manifold may be initiated by opening an air intake throttle and possibly opening a CAC valve or an intake manifold valve (as described above with reference to 422 in method 400). In other embodiments, the method at 608 may include opening the throttle and downshifting to a lower gear if one is available, even if the required thresholds were not met at 604. In this way, the smaller gear downshift may still increase manifold vacuum and, along with increased airflow from the open throttle, purge condensate from the CAC. Further, the throttle opening may be increased to compensate for the smaller gear downshift.

Alternatively at 604, if the required downshift is possible, the routine continues on to 606 to confirm if there is engine braking. As described above, engine braking may be used to aid in slowing down the vehicle during a deceleration event. If engine braking is required, the routine checks at 610 if there is a lower gear available which may continue to provide the required engine braking. If the lower gear with engine braking is confirmed, condensate purging is initiated by downshifting a transmission gear at 612 to increase RPM. As the engine spins faster, condensate is drawn from the CAC into the engine. An intake throttle may also open at 612 to increase airflow through the CAC and increase the amount of condensate purged. Increased airflow to the engine, responsive to increasing throttle opening, may decrease engine braking. Therefore, the routine at 614 may adjust alternate vehicle brakes (e.g., wheel brakes) to maintain the required braking level. For example, if throttle opening decreases engine braking to a level less than required, increasing wheel brakes by a proportional amount may allow the vehicle to maintain the same level of braking. In another example, where the engine or drive-train is coupled to an electric machine (e.g., in a hybrid electric vehicle) or any other hybrid-like device (hydraulic or pneumatic), the devices could be operated in an energy or torque absorbing mode to maintain the desired deceleration rate while keeping engine speed and mass flow rate high (to continue purging the condensate during the deceleration).

Next at 616, it may be determined if the condensate level has dropped to below the threshold level. That is, it may be determined if the CAC has been sufficiently purged. If yes, then at 620, the routine includes stopping purging of condensate from the CAC to the intake manifold by closing vales used for purging (the CAC valve and/or the intake manifold valve). The downshifted transmission gear and intake throttle may also be adjusted back to their requested positions. After completing the purging, the condensate level at the CAC may be updated. Else, if the condensate level has not dropped below the threshold level, the routine may continue purging condensate to the engine intake manifold at 618.

It will be appreciated that in further embodiments, the purging during the deceleration event may also be stopped in response to a resuming of engine cylinder fueling. For example, in response to a sudden increase in torque demand (e.g., a tip-in, or the vehicle reaching an uphill segment), cylinder fueling may be resumed and the purging during a DFSO event may be stopped. In one example, if purging has not been completed and the vehicle driver tips in, further purging may be discontinued. The controller may initiate an alternate purging routine to enable completion of condensate purging during an engine acceleration event, as elaborated above. Alternatively, if the engine speed drops below a threshold speed during the deceleration (e.g., due to a corresponding drop in vehicle speed), such that insufficient manifold vacuum is available for purging the condensate, the CAC valve or intake manifold valve may be closed to stop purging condensate. In one example, if purging has not been completed and the engine has spun to rest, further purging may be discontinued. In still a further embodiment, as the engine speed changes (e.g., decreases) during the deceleration, the intake throttle opening may be adjusted (e.g., increased) to maintain a threshold amount of intake manifold vacuum for the purging operation. Then, when throttle adjustments cannot be used to provide the threshold intake manifold vacuum, the purging may be stopped. As an example, the increasing airflow may be continued for a duration until an earlier of the amount of condensate in the charge air cooler is below the threshold and fuel injection to the deactivated cylinder is resumed. In each case, after stopping the purging, the condensate level at the CAC may be updated. Alternatively, the CAC level can be updated as the purging happens. For example, the controller may characterize the mass of water purged as a function of the air mass flow rate. Then, at each execution of the software task loop (the purging routine), the water level can be integrated down by the amount cleansed. A hysteresis may be added to the purge cycle threshold so that the routine is not exited until adequate purging has been performed.

In this way, purging condensate during a deceleration event by downshifting a transmission from a first, higher gear to a second, lower gear may proceed when the first transmission gear is above a threshold gear and/or when the gear difference between the first and second gear is higher than a threshold difference. In a first example, the condensate level in the CAC may be high, requiring a larger gear downshift. In this case, the gear threshold difference may be set at two. If the vehicle is in the transmission fourth gear, the transmission may be downshifted to the transmission second gear to purge condensate. Alternatively, the controller may downshift the transmission from the transmission fourth gear to the transmission first gear to purge condensate at a faster rate. However, if the vehicle is in the transmission second gear, the required gear downshift of two gears is not met. Thus, purging by downshifting may not be possible. However, the controller may increase throttle opening and downshift the transmission from the transmission second to transmission first gear to purge a smaller amount of condensate. In another example, the throttle opening may be increased along with the smaller gear downshift in order to purge a larger amount of condensate. In this way, throttle opening and downshifting may be coordinated to increase manifold vacuum sufficiently during the deceleration to purge the CAC condensate.

In a second example, the condensate level in the CAC may be lower (but still above a threshold to initiate purging during a deceleration event), requiring a smaller gear downshift to purge the condensate. In this case, the gear threshold difference may be set to one and the gear threshold may be set to the transmission first gear. If the vehicle is in the transmission third gear, the controller may downshift to the transmission second gear to purge condensate. Alternatively, the controller may downshift from the transmission third gear to the transmission first gear to increase the rate of condensate purging. Determining which gear to shift to may depend on other engine operating conditions, such as rate of vehicle deceleration and engine braking requirements. For example, if increased engine braking is needed, the controller may downshift from the transmission third gear to the transmission first gear to increase engine braking and condensate purging. Returning to the second example, if the vehicle is instead in the transmission first gear, condensate may not be purged by downshifting. Since the vehicle is in the transmission first gear, a lower gear is not available. Thus, downshifting is not possible and condensate purging may be initiated by opening the throttle.

Now turning to FIG. 7, graph 700 shows an example condensate purging operation during acceleration and deceleration events. Specifically, graph 700 shows a change in pedal position (PP) indicative of an operator torque demand at plot 702, a corresponding change in vehicle speed is shown at plot 704, and a corresponding change in engine speed (Ne or RPM) is shown at plot 706. Plot 707 depicts a change in engine mass fuel. A change in transmission gear is shown at plot 714 where 4 is the highest available gear and 1 is the lowest available gear. Further, changes to a CAC condensate level are shown at plot 708, changes to an air intake throttle position are shown at plot 710, and changes to the position of a CAC valve of the CAC are shown at plot 712. While plot 712 of the depicted example is shown with reference to a CAC valve, such as the valve of FIGS. 2A-B, in an alternate embodiment, the same adjustments may be performed with reference to an intake manifold valve, such as the valve of FIGS. 3A-B. Further, the same operations may be performed in embodiments of a CAC not including a valve for varying a volume of the CAC.

Prior to t1, a vehicle operator may have applied the accelerator pedal to request torque and vehicle speed (plot 706). Accordingly, a pedal position may be higher than a threshold (plot 702), and an engine speed may be elevated to provide the desired torque (plot 704) and desired vehicle speed. Additionally, the vehicle may begin in a transmission gear 3 (714). During this time, in response to the engine load being higher than a threshold, a CAC valve may be opened to allow air to flow through the CAC. However, even with the CAC valve open, condensate level may be gradually increasing (plot 708) and shortly before t1, the condensate level may increase above threshold level 709, indicating a need for CAC condensate purging.

At t1, a tip-out event may occur, as indicated by the drop in pedal position. In response to the tip-out, the intake air throttle opening may be initially decreased (or closed) to reduce air flow through the engine. The engine speed may track the vehicle speed. In response to the drop in engine load, the CAC valve may be closed to reduce airflow through the CAC. At t2, the vehicle may start decelerating. In response to the reduced torque demand during the deceleration, fuel injection to engine cylinders may be shut off. That is, a deceleration fuel shut off (DFSO) operation may be performed. Due to the DFSO event, an engine fuel mass may decrease (708). Also, as a result of the DFSO event, engine braking may be enabled.

As such, in response to the deceleration event, intake airflow may be reduced and maintained at the reduced level until increased torque is subsequently demanded by the vehicle operator (e.g., due to a tip-in following the deceleration event). However, in the present example, in response to the condensate level being higher than the threshold during the DFSO event, at t2, condensate may be purged from the CAC. In this example, the vehicle is in transmission gear 1 at t2 (714). Thus, since a lower gear is not available, condensate purging may be initiated by increasing airflow through the CAC. An opening of the intake throttle may be increased (e.g., the throttle may be fully opened) while the CAC valve is closed to enable purging of the condensate from the CAC into the engine intake. In particular, by closing the CAC valve, a volume of the CAC is decreased while at the same time, by opening the intake throttle, an airflow through the engine and the CAC is increased. This allows condensate stored in the smaller volume of the CAC to be rapidly purged between t2 and t3 (e.g., in a couple of seconds). At t3, once purging of the smaller volume of the CAC is completed, the CAC valve may be opened while the intake throttle is maintained open to allow the rest of the CAC to be purged during the DFSO event. At t4, purging of the CAC may be considered complete in response to the condensate level being below the threshold level. In response to the purging being completed while deceleration conditions are still present, the intake throttle may be closed to reduce airflow. In addition, the CAC valve may be closed to reduce airflow through the CAC during the low load condition.

In this way, during the deceleration event, the CAC valve may be opened and closed, with the opening and closing of the CAC valve based at least on the amount of condensate in the charge air cooler (and independent of the engine load). In addition, since the purging occurs while no cylinder combustion is occurring, concomitant engine actuator adjustments required for misfire control are not required. For example, a spark timing may be maintained. It will be appreciated that while the example in the depicted figure shows the throttle maintained open between t2 and t4, in alternate embodiments, an opening of the throttle may be dynamically adjusted between t2 and t4 based on the change in engine speed to maintain an amount of intake manifold vacuum for sufficient purging of condensate from the CAC into the engine intake.

At t5, the vehicle operator may tip-in, as indicated by the sudden increase in pedal position. In response to the tip-in, the intake throttle may be opened to provide the desired airflow and meet the torque demand. In addition, an engine speed, vehicle speed, and transmission gear may increase. As such, during an acceleration event, an opening and closing of the CAC valve is based on the engine load. Therefore, in response to the high load condition at the tip-in, the CAC valve may be reopened. While the valve is open, the increased airflow of the tip-in can be advantageously used to purge at least some condensate from the CAC (or reduce accumulation of condensate at the CAC), even though condensate levels at the CAC are not sufficiently high to need an active purging routine.

A second later tip-in occurring after an amount of time has elapsed is shown at t6. Herein, during the second later tip-in, the condensate levels at the CAC may be sufficiently high and an active purging routine may be requested. Herein, in response to the tip-in, the intake throttle opening may be increased to provide increased airflow. The increased airflow may then be advantageously used to purge condensate from the CAC to the intake. In particular, the CAC valve may be opened while the throttle is open to rapidly purge the stored condensate. In addition, one or more alternate engine operating parameters (not shown) may be adjusted to maintain the desired torque. For example, while the condensate is being purged to the intake during the tip-in, a spark ignition timing may be advanced, or an amount of retard may be limited. In one example, the controller may meter the amount of ingested water by limiting or shaping the response of the air mass inducted curve. A spark timing adjustment may then be used to maintain combustion timing (e.g., to avoid late burns).

A second later tip-out occurring after another amount of time has elapsed is shown at t7. Herein, during the second later tip-out, the condensate levels at the CAC (708) may be below a threshold level 709 such that no clean-out cycle is initiated. In response to the tip-out, the air intake throttle opening may be closed (710). The vehicle may begin decelerating at t8 (704) and fuel injection to engine cylinders may be shut off That is, a deceleration fuel shut off (DFSO) operation may be performed. Due to the DFSO event, an engine fuel mass may decrease (708). Also, as a result of the DFSO event, a transmission gear may be downshifted from transmission gear 3 to transmission gear 2 and engine braking may be enabled.

Thus, during a first condition, as shown at t6, when intake air flow is higher than a threshold flow, condensate is delivered from a charge air cooler to an engine during an engine acceleration event. Then, during a second condition, as shown at t2, when intake vacuum is higher than a threshold vacuum, condensate is delivered from the charge air cooler to the engine during an engine deceleration event. Herein during the first condition, a first smaller (net) amount of condensate is delivered and during the second condition, a second larger (net) amount of condensate is delivered to the engine intake. Further, during the first condition, fuel is injected to engine cylinders during the delivering of condensate while during the second condition, fuel is not injected to engine cylinders during the delivering. Further, during the first condition, an intake throttle opening is increased based on a pedal position to increase air flow, while during the second condition, the intake throttle opening is increased based on a condensate level at the charge air cooler, the inability to shift to a lower gear, and an engine speed to increase intake manifold vacuum. Likewise, during the first condition, opening of a valve coupled to the charge air cooler is based on an engine load, while during the second condition, opening of the valve coupled to the charge air cooler is based on a condensate level at the charge air cooler. Further still, during the first condition, spark ignition timing is advanced while during the second condition, spark ignition timing is maintained.

A third condition, wherein condensate is purged from the CAC in response to a deceleration event and the ability to shift to a lower gear, is shown at FIG. 8. Graph 800 illustrates an example of purging condensate from a CAC, during a deceleration event, by downshifting a transmission gear and opening an intake throttle to increase engine speed (Ne or RPM) and draw condensate into the intake manifold.

Specifically, graph 800 shows a change in pedal position (PP) indicative of an operator torque demand at plot 802, a corresponding change in vehicle speed is shown at plot 804, and a corresponding change in engine speed (Ne or RPM) is shown at plot 806. A change in transmission gear is shown at plot 814 where 4 is the highest available gear and 1 is the lowest available gear. Plot 807 depicts a change in engine mass fuel. Further, changes to a CAC condensate level (CL) are shown at plot 808, changes to an air intake throttle position are shown at plot 810, and changes to the position of a CAC valve of the CAC are shown at plot 812. While plot 712 of the depicted example is shown with reference to a CAC valve, such as the valve of FIGS. 2A-B, in an alternate embodiment, the same adjustments may be performed with reference to an intake manifold valve, such as the valve of FIGS. 3A-B. Alternatively, example 800 may proceed without CAC valve or intake manifold valve adjustments if the CAC is not equipped with these valves. Further, graph 800 shows changes in engine braking at plot 816 and changes to alternate vehicle brakes (e.g., wheel brakes).

As in FIG. 7, prior to t11, a vehicle operator may have applied the accelerator pedal to request torque and vehicle speed (plot 806). Accordingly, a pedal position may be higher than a threshold (plot 802), and an engine speed may be elevated to provide the desired torque (plot 804) and desired vehicle speed. Additionally, the vehicle may begin in a transmission gear 3 (814), without applying wheel brakes (818) or engaging engine braking (816). During this time, in response to the engine load being higher than a threshold, a CAC valve may be opened to allow air to flow through the CAC. However, even with the CAC valve open, condensate level may be gradually increasing (plot 808) and shortly before t11, the condensate level may increase above threshold level 809, indicating a need for CAC condensate purging.

At t11, a tip-out event may occur, as indicated by the drop in pedal position (802). In response to the tip-out, the intake air throttle opening may be initially decreased (or closed) to reduce air flow through the engine. The engine speed may track the vehicle speed. In response to the drop in engine load, the CAC valve may be closed to reduce airflow through the CAC. At t12, the vehicle may start decelerating. In response to the reduced torque demand during the deceleration, fuel injection to engine cylinders may be shut off. That is, a deceleration fuel shut off (DFSO) operation may be performed. Due to the DFSO event, an engine fuel mass may decrease (plot 807). Also, as a result of the DFSO event, engine braking may be enabled (816).

As such, in response to the deceleration event, intake airflow may be reduced and maintained at the reduced level until increased torque is subsequently demanded by the vehicle operator (e.g., due to a tip-in following the deceleration event). However, in the present example, in response to the condensate level being higher than the threshold during the DFSO event, at t2, condensate may be purged from the CAC. In this example, the vehicle is in transmission gear 3 at t2 (814). In this example, the threshold difference for the gear downshift may be set at one, based on the amount of condensate in the CAC. Thus, since the difference between the first (transmission gear 3) and second (transmission gear 1) gear is higher than the threshold difference, condensate purging may be initiated by shifting from transmission gear 3 to transmission gear 1. In this way, by shifting from a higher to a lower transmission gear, engine speed increases (806) and manifold vacuum increases, pulling condensate from the CAC to the intake manifold. In some embodiments, the throttle opening may be increased while a transmission gear is downshifted to further increase airflow through the engine and CAC, thereby increasing purging efficiency (810). The increased throttle opening may decrease engine braking. As such, between t12 and t14 of the deceleration event, when engine braking is used to slow the vehicle, alternate vehicle braking efforts may be adjusted to maintain a desired deceleration rate. For example, a vehicle control system may coordinate and adjust the braking efforts of alternate vehicle brakes (e.g., wheel brakes) to maintain the desired deceleration rate. Specifically, as shown in graph 800, wheel braking effort may be increased (818) at t13 to compensate for decreased engine braking (816). In alternate embodiments, other torque-absorbing means may be used additionally or alternatively to wheel brakes to compensate for decreased engine braking. For example, in embodiments where the engine or drive-train is coupled to an electric machine (e.g., in a hybrid electric vehicle) or any other hybrid-like device (hydraulic or pneumatic), the devices could be operated in an energy or torque absorbing mode to maintain the desired deceleration rate while keeping engine speed and mass flow rate high (to continue purging the condensate during the deceleration).

While the opening of the intake throttle is increased at t12, the CAC valve may be closed to enable purging of the condensate stored in a smaller volume of the CAC. At t13, once purging of the smaller volume of the CAC is completed, the CAC valve may be opened while the intake throttle is maintained open to allow the rest of the CAC to be purged during the DFSO event. At t14, purging of the CAC may be considered complete in response to the condensate level being below the threshold level. In response to the purging being completed while deceleration conditions are still present, the intake throttle may be closed to reduce airflow. As a result, wheel brakes may be reduced (818) at t14 since engine braking may no longer be reduced by throttle opening. In addition, the CAC valve may be closed to reduce airflow through the CAC during the low load condition. At t15, the vehicle operator may tip-in, as indicated by the sudden increase in pedal position and any braking may be stopped. In response to the tip-in, the intake throttle may be opened to provide the desired airflow and meet the torque demand. In addition, an engine speed, vehicle speed, and transmission gear may increase.

At t16, condensate level in the CAC increases above threshold level 809. At t17, a tip-out event may occur again, as indicated by the drop in pedal position (802). In response to the tip-out, the intake air throttle opening may initially decrease (or close) to reduce air flow through the engine. At t18, the vehicle may start decelerating and fuel injection to engine cylinders may be shut off Due to the DFSO event, an engine fuel mass may decrease (plot 807). Also, as a result of the DFSO event, engine braking may be enabled (816).

In this example, the vehicle is in transmission gear 2 at t18 (814). Since condensate level is higher at t18 than it was at t12, the threshold difference for the gear downshift may be set higher at two (vs. one in the example at t12). Thus, since the difference between the first ($2^{nd}$) and second ($1^{st}$) gear is lower than the threshold difference, condensate purging may be initiated by increasing throttle opening at t18 (810). Even though the gear difference is lower than the threshold, the vehicle may still downshift from the transmission gear 2 to transmission gear 1 at t18. This smaller downshift may increase engine speed (806). However, the increase is less than the example at t12, during the larger downshift. Throttle opening at t18 may be greater than at t12 to compensate for the smaller gear shift and the larger amount of condensate. In this way, by performing a smaller gear shift while increasing throttle opening to a greater level, condensate may be purged from the CAC to the intake manifold. Due to a smaller gear downshift, condensate may purge more slowly at t18 than at t12.

Thus, condensate may be delivered from a CAC to an engine during an engine deceleration event. During a second condition, as shown at t2 in graph 700, condensate purging is initiated by increasing airflow through the CAC by increasing the opening of a throttle. Alternatively, during a third condition, as shown at t12 in graph 800, condensate purging is initiated by downshifting a transmission gear and increasing engine speed (RPM). A throttle opening may also be increased to increase airflow through the CAC. During the third condition (t12 to t14), engine speed increases to a higher RPM level than during the second condition (t2 to t4). This may allow a larger (net) amount of condensate to be delivered to the engine intake in a shorter period of time. For example, the duration of condensate purging between t2 and t4 in graph 700 may be longer than the duration of condensate purging between 12 and t14 in graph 800. Thus, condensate purging may be more efficient during a deceleration event when downshifting a transmission gear is used in conjunction with increasing throttle opening.

In this way, condensate stored in a CAC can be purged to an engine intake during a deceleration event. By downshifting a transmission gear, while increasing airflow through the engine intake manifold and the CAC during the deceleration event, misfires occurring due to ingestion of water into an engine and a resulting slow burn can be reduced. In particular, by drawing in the condensate during conditions when engine cylinders are not combusting, misfires as well as issues related to degraded combustion stability are reduced. Additionally, by downshifting a transmission gear, purging efficiency may be increased while utilizing the increased manifold vacuum. Further, concurrent engine actuator adjustments otherwise needed for misfire control may not be required. As such, this allows a larger amount of condensate to be purged into the engine without increasing engine misfires.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for a boosted engine, comprising:
during a deceleration event while engine cylinder fuel injection is deactivated, while the engine is spinning, and while cylinder valves are still active, selectively downshifting an automatic transmission having a clutch from a first, higher gear to a second, lower gear to increase engine speed and increase engine airflow in response to a condensate level in a charge air cooler.

2. The method of claim 1, wherein the engine is a turbocharged engine having direct fuel injection.

3. The method of claim 2, further comprising, during the deceleration event, increasing an opening of an intake throttle to increase airflow through the charge air cooler.

4. The method of claim 3, wherein the increasing airflow and downshifting the transmission is continued for a duration until an amount of condensate in the charge air cooler is below a threshold.

5. The method of claim 3, wherein the opening of the intake throttle increases as the engine speed decreases during the deceleration event to maintain a threshold vacuum.

6. The method of claim 1, wherein selectively downshifting during the deceleration event includes downshifting the transmission if a gear difference between the first and second gear is higher than a threshold difference.

7. The method of claim 6, wherein selectively downshifting further includes increasing an opening of an intake throttle to increase airflow through the charge air cooler and not downshifting the transmission if the gear difference between the first and second gear is lower than the threshold difference.

8. The method of claim 3, wherein increasing airflow through a charge air cooler includes decreasing engine braking.

9. The method of claim 8, wherein the engine is coupled to a vehicle, the method further comprising:
adjusting an amount of wheel braking during the increasing airflow to maintain a vehicle deceleration rate.

10. The method of claim 8, wherein the engine is coupled to a hybrid electric vehicle, the method further comprising, during the increasing airflow, operating an electric machine of the hybrid electric vehicle in a torque-absorbing mode to maintain a vehicle deceleration rate.

11. The method of claim 1, wherein the deceleration event includes a tip-out.

12. A vehicle engine method, comprising:
in response to a condensate level in a charge air cooler and during conditions when engine direct injection fueling is selectively deactivated and a transmission gear is above a threshold gear, downshifting the transmission gear to increase engine speed and opening a throttle to increase airflow through a charge air cooler.

13. The method of claim 12, wherein the engine is a turbocharged engine.

14. The method of claim 13, wherein the increasing airflow and downshifting the transmission gear is continued for a duration until an amount of condensate in the charge air cooler is below a threshold.

15. The method of claim 13, wherein the downshifting the transmission gear includes downshifting a transmission from a first higher gear to a second lower gear, wherein the second gear is selected based on the condensate level in the charge air cooler.

16. The method of claim 15, wherein the second gear has a higher gear ratio as the condensate level increases.

17. The method of claim 13, wherein the vehicle is a hybrid electric vehicle, the method further comprising, during the increasing airflow, increasing one or more of a wheel brake torque and motor torque to maintain a vehicle deceleration rate, the increasing based on the throttle opening.

18. An engine method, comprising:
during a first condition when an automatic transmission having a clutch is in a first transmission gear that is higher than a threshold gear, delivering condensate from a charge air cooler to an engine intake manifold by downshifting a transmission gear to a second transmission gear that is lower than the first transmission gear and opening an air intake throttle; and
during a second condition when the transmission in a third transmission gear that is lower than the threshold gear, delivering condensate from the charge air cooler to the engine intake manifold by maintaining the transmission gear while opening the air intake throttle.

19. The method of claim 18, wherein the engine is a turbocharged direct injection engine.

20. The method of claim 19, wherein the threshold gear is based on an amount of condensate in the charge air cooler and wherein increasing airflow through the charge air cooler further includes opening one of a valve coupled to the charge air cooler and a valve coupled between an outlet or inlet of the charge air cooler and an engine intake manifold.

* * * * *